(12) United States Patent
Han et al.

(10) Patent No.: US 10,970,668 B2
(45) Date of Patent: *Apr. 6, 2021

(54) DEPOT DISPATCH PROTOCOL FOR AUTONOMOUS LAST-MILE DELIVERIES

(71) Applicant: DoorDash, Inc., San Francisco, CA (US)

(72) Inventors: Jeff Ning Han, Palo Alto, CA (US); Dan Michael Babcock, Fairfield, CA (US); Thomas Scott Stephens, New York, NY (US); Cody Duane Aughney, San Francisco, CA (US)

(73) Assignee: DoorDash, Inc., San Francisco, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 16/191,998

(22) Filed: Nov. 15, 2018

(65) Prior Publication Data
US 2020/0160268 A1    May 21, 2020

(51) Int. Cl.
*G06Q 10/08* (2012.01)
*G08G 1/00* (2006.01)
*G06N 3/08* (2006.01)
*G05D 1/00* (2006.01)

(52) U.S. Cl.
CPC ..... *G06Q 10/08355* (2013.01); *G05D 1/0088* (2013.01); *G06N 3/08* (2013.01);
(Continued)

(58) Field of Classification Search
CPC ......... G06Q 10/08355; G06Q 10/0832; G06Q 10/0833; G06Q 30/0633
See application file for complete search history.

(56) References Cited

U.S. PATENT DOCUMENTS

| 10,043,149 | B1* | 8/2018 | Iacono | .................... G07F 17/40 |
| 2002/0152128 | A1* | 10/2002 | Walch | ................ G06Q 30/0633 |
| | | | | 705/26.2 |

(Continued)

OTHER PUBLICATIONS

Hetal Bhavsar, "A Comparative Study of Training Algorithms for Supervised Machine Learning", 2012, p. 74-76 (Year: 2012).*

(Continued)

*Primary Examiner* — Kevin H Flynn
*Assistant Examiner* — Ibrahim N El-Bathy
(74) *Attorney, Agent, or Firm* — Kwan & Olynick LLP

(57) ABSTRACT

Provided are various systems and processes for improving last-mile delivery of real-time, on-demand orders for perishable goods. In one aspect, a method is provided for aggregating on-demand deliveries using a depot dispatch protocol which may implement automated order transport and retrieval systems. The method comprises dispatching merchant couriers to transport on-demand orders from merchants to a merchant depot where the orders are aggregated and batched based on optimized delivery routes and destination proximities. Batches of orders are then transported to a customer depot corresponding to an area of delivery destinations. Orders are then assigned to delivery couriers for completion of delivery to customers. Such delivery routing systems and processes may be implemented alongside a delivery tracking system for generating estimated time of arrival predictive updates for real-time delivery of perishable goods. The described mechanisms improve courier efficiency, improve delivery tracking, and reduce overall delivery times.

20 Claims, 17 Drawing Sheets

(52) U.S. Cl.
CPC ..... *G06Q 10/0832* (2013.01); *G06Q 10/0833* (2013.01); *G08G 1/202* (2013.01); *G05D 2201/0213* (2013.01)

(56) References Cited

U.S. PATENT DOCUMENTS

| | | |
|---|---|---|
| 2014/0164126 A1 | 6/2014 | Nicholas et al. |
| 2014/0188750 A1* | 7/2014 | Seiler ................. G06Q 10/0834 705/335 |
| 2014/0278686 A1* | 9/2014 | Mullings ............ G06Q 10/1097 705/7.21 |
| 2014/0370167 A1 | 12/2014 | Garden |
| 2015/0227888 A1* | 8/2015 | Levanon ............ G06Q 10/0834 705/334 |
| 2015/0370251 A1 | 12/2015 | Siegel et al. |
| 2015/0379468 A1 | 12/2015 | Harvey |
| 2016/0350837 A1* | 12/2016 | Williams ........... G06Q 30/0633 |
| 2018/0253805 A1 | 9/2018 | Kelly et al. |

OTHER PUBLICATIONS

International Application Serial No. PCT/US2019/061499, Search Report and Written Opinion dated Mar. 10, 2020. 12 pgs.
"Synchronized Last-Mile Logistics for Sustainable, Efficient Urban Delivery," vol. 13—Nov, CUL gsb.stanford.edu/r/vcii, Jun. 2016, 26 pages.
"Technological Disruption and Innovation in Last-Mile Delivery," gsb.stanford.edu/r/vcii, Jun. 2016, 26 pages.

* cited by examiner

US 10,970,668 B2

DEPOT DISPATCH PROTOCOL FOR AUTONOMOUS LAST-MILE DELIVERIES

TECHNICAL FIELD

The present disclosure relates to a logistics platform system for facilitating real-time, on-demand delivery of perishable goods. In one example, the present disclosure relates to mechanisms and processes for optimizing such deliveries using aggregating depots.

BACKGROUND

Logistics platforms, particularly logistics platforms for managing real-time on-demand delivery of perishable goods, rely on accurate location, status, and routing mechanisms to effectively and efficiently connect consumers with providers. However, logistics platforms may be inefficient or experience delays when the various goods originate from providers located in different locations including high congestion commercial areas.

Consequently, it is desirable to provide improved mechanisms for optimizing delivery routes and the handling of orders, particularly with respect to logistics platforms for managing real-time on-demand deliveries of perishable goods.

SUMMARY

Provided are various mechanisms and processes for optimizing real-time, on-demand delivery of perishable goods. In one aspect, which may include at least a portion of the subject matter of any of the preceding and/or following examples and aspects, a method is provided for aggregating on-demand deliveries using a depot dispatch protocol. The method comprises receiving a first order message from a first device corresponding to a first customer. The first order message includes a first timestamp and a first order for real-time delivery of perishable goods from a first restaurant. The first customer is located in a delivery area.

An estimated time of arrivals (ETA) is dynamically generated for each of one or more events based on the first timestamp and a plurality of weighted factors including historical restaurant data. The method further comprises scheduling a first merchant courier, based on one or more of the ETAs, to receive the first order from the first restaurant and deliver the first order to the merchant depot.

The method further comprises grouping the first order into a first batch of orders. The first batch of orders may include one or more orders and may be grouped based upon the proximity of corresponding delivery destinations of the one or more orders in the first batch of orders. The method further comprises scheduling a depot courier, based on one or more of the ETAs, to receive the first batch of orders at the merchant depot and deliver the first batch of orders from the merchant depot to a customer depot. The customer depot corresponds to the delivery area.

The method further comprises identifying the delivery area as an autonomous zone configured for operation of an autonomous vehicle. The method further comprises dispatching a first delivery courier, based on one or more of the ETAs, to receive the first order at the customer depot and complete the delivery of the first order to the first customer in the delivery area. The first delivery courier comprises a first autonomous vehicle.

The method may further comprise receiving one or more other batches of orders at the customer depot. The one or more other batches of orders may be received from one or more other merchant depots by one or more other depot couriers.

The plurality of weighted factors may further include one or more of the following: data on the dishes in the first order, a sub-total of the first order, a number of current orders received at the first restaurant, time, data, and weather. The one or more events may include one or more of the following: completion of the first order by the first restaurant, arrival of the first order at a merchant depot, arrival of the first order at a customer depot, and delivery of the first order to the first customer. Various events of the plurality of events may be received from one or more client devices corresponding to one or more of the following: the first merchant courier, the depot courier, the first delivery courier, the first restaurant, the merchant depot, the customer depot, and the first customer.

The depot courier may comprise a second autonomous vehicle. The depot courier may travel along a predetermined route between the merchant depot and the customer depot.

The customer depot may comprise an automated locker system with a plurality of storage compartments for storing one or more orders. The plurality of storage compartments may be configured to authenticate one or more of the following: the depot courier and the first delivery courier.

The method may further comprise receiving a second order message from a second device corresponding to a second customer. The second order message may include a second timestamp and a second order for real-time delivery of perishable goods from a second restaurant. The second customer is located in the delivery area.

The method may further comprise dynamically generating an ETA for each of the one or more events based on the second timestamp and the plurality of trained weighted factors. The one or more events may further include one or more of the following: completion of the second order by the second restaurant, arrival of the second order at the merchant depot, arrival of the second order at the customer depot, and delivery of the second order to the second customer.

The method may further comprise scheduling a second merchant courier, based on one or more of the ETAs, to receive the second order from the second restaurant and deliver the second order to the merchant depot. The method may further comprise grouping the second order into the first batch of orders.

The method may further comprise scheduling a second delivery courier, based upon one or more of the ETAs, to receive the second order from at the customer depot and complete the delivery of the second order to the second customer in the delivery area.

In various embodiments, the plurality of ETA time durations may be dynamically generated using a neural network located on a processor configured to operate in a training mode and an inference mode.

In the training mode, the processor is configured to pass a dataset into the neural network. The dataset includes a series of successive training events with corresponding known time durations between training events. In the training mode, the processor is further configured to train the neural network to accurately and dynamically output ETA predictive updates. Training the neural network may include inputting different combinations of training events and time durations, and comparing actual time of arrivals (ATAs) with generated ETA predictions to allow for the neural network to automatically and iteratively adjust the plurality of weighted factors in the neural network.

In the inference mode, the processor is configured to pass a first event of the plurality of events into the neural network, the first event including an initial timestamp, automatically generate a first ETA prediction for the plurality of events based on the plurality of adjusted weighted factors, pass a second event of the plurality of events into the neural network, the second event including an updated timestamp, and automatically adjust the first ETA prediction to form a second updated ETA prediction for the plurality of events.

Other implementations of this disclosure include corresponding devices, systems, and computer programs configured to perform the described methods. These other implementations may each optionally include one or more of the following features. For instance, provided is a server system comprising one or more processors, memory, and one or more programs stored in the memory. The one or more programs comprise instructions for implementing the described methods. The one or more programs may further comprise instructions for dynamically generating the plurality of ETA time durations using a neural network on the one or more processors by operating in a training mode and an inference mode.

Also provided is a programmable device configured for aggregating on-demand deliveries. According to various embodiments, the programmable device is configured for receiving a first order message from a first device corresponding to a first customer. The first order message includes a first timestamp and a first order for real-time delivery of perishable goods from a first restaurant. The first customer is located in a delivery area. The programmable device is further configured for dynamically generating an estimated time of arrivals (ETAs) for each of one or more events based on the first timestamp and a plurality of weighted factors including historical restaurant data.

The programmable device is further configured for scheduling a first merchant courier, based on one or more of the ETAs, to receive the first order from the first restaurant and deliver the first order to a merchant depot. The programmable device is further configured for grouping the first order into a first batch of orders. The first batch of orders may include one or more orders and may be grouped based upon the proximity of corresponding delivery destinations of the one or more orders in the first batch of orders.

The programmable device is further configured for scheduling a depot courier, based on one or more of the ETAs, to receive the first batch of orders at the merchant depot and deliver the first batch of orders from the merchant depot to a customer depot. The customer depot corresponds to the delivery area.

The programmable device is further configured for identifying the delivery area as an autonomous zone configured for operation of an autonomous vehicle. The programmable device is further configured for dispatching a first delivery courier, based on one or more of the ETAs, to receive the first order at the customer depot and complete the delivery of the first order to the first customer in the delivery area. The first delivery courier comprises a first autonomous vehicle.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

DETAILED DESCRIPTION OF PARTICULAR EMBODIMENTS

Figure 1:
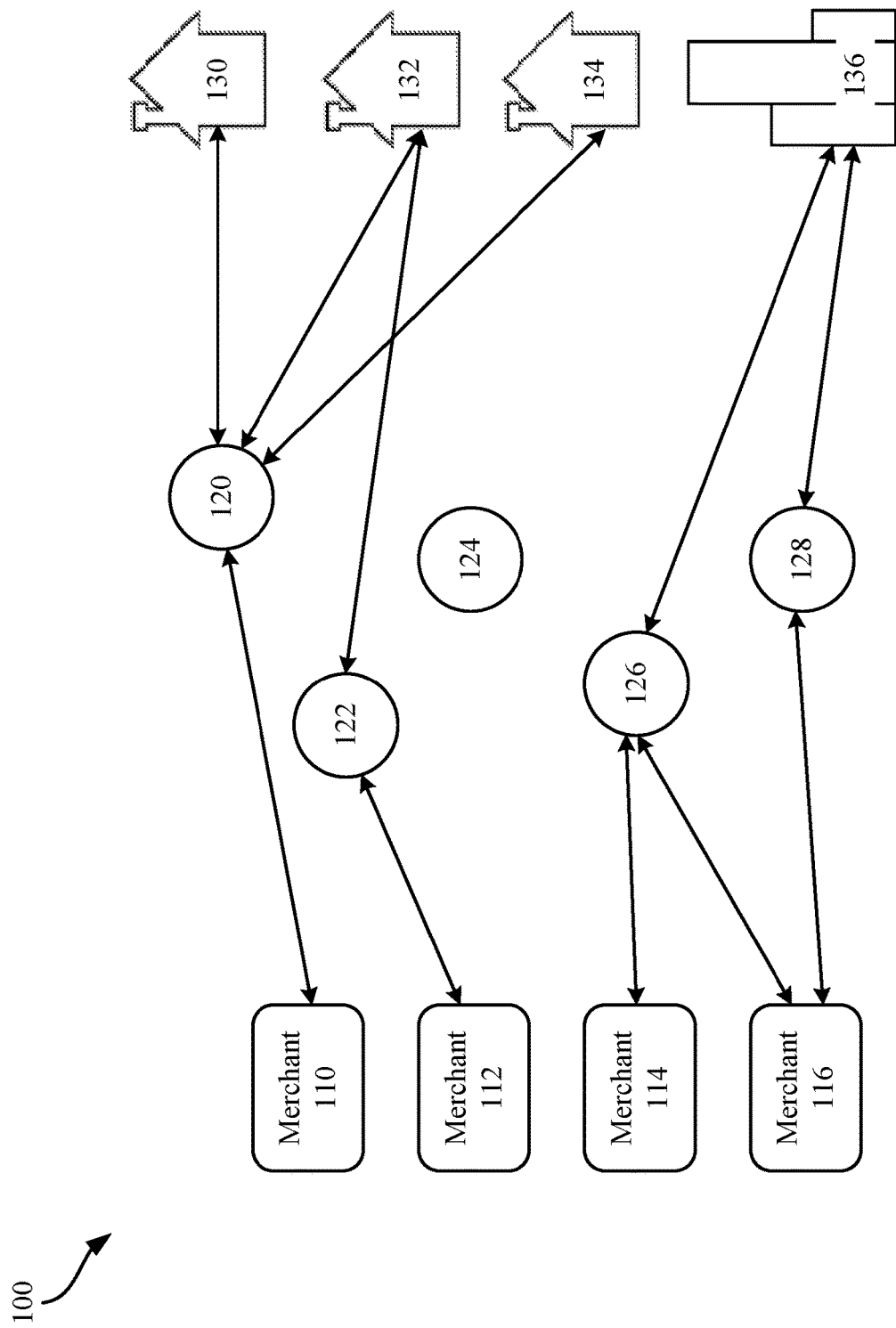
FIG. 1 illustrates one example of a delivery logistics system having multiple merchants, couriers, and customers, in accordance with one or more embodiments.

Reference will now be made in detail to some specific examples of the disclosure including the best modes contemplated by the inventors for carrying out the disclosure. Examples of these specific embodiments are illustrated in the accompanying drawings. While the present disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

In the following description, numerous specific details are set forth in order to provide a thorough understanding of the present disclosure. Particular embodiments of the present disclosure may be implemented without some or all of these specific details. In other instances, well known process operations have not been described in detail in order not to unnecessarily obscure the present disclosure.

For example, the techniques of the present invention will be described in the context of particular protocols, such as Wi-Fi or Bluetooth. However, it should be noted that the techniques of the present invention may also be applied to variations of protocols. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

With regard to the present disclosure, logistics platforms managing real-time on-demand deliveries of perishable goods rely on accurate location, status, and routing mechanisms to allow for effective and efficient delivery experiences between providers and customers. In particular, providers located in a variety of disparate locations, particular highly congested disparate locations, can make it difficult for couriers and delivery people to easily pick up perishable goods from these locations. These may be restaurants located in high traffic areas with limited parking. As used herein, the term "provider" may be used to describe various types of merchants that provide goods, including perishable goods, and the terms "provider" and "merchant" may be used interchangeably. As used herein, the term "delivery associate" may be used to describe a driver or courier that is delivers the goods provided by the merchant to a customer, and the terms "delivery associate" and "courier" may be used interchangeably.

Overview

The systems and methods described herein improve last-mile delivery logistics for delivery of perishable goods from a merchant to a customer. Last-mile delivery generally refers to the movement of goods from a transportation depot or hub to a final delivery destination. According to various embodiments, a depot dispatch protocol may be implemented where orders are transported between one or more aggregation depots, including merchant depots and customer depots, along last-mile delivery routes to the final destinations.

In current systems, a group of merchants or customers may be located in regions with high dispatch concentration and/or high congestion due to high foot and vehicle traffic or lack of parking. For example, couriers may require additional time to navigate through and look for parking in downtown areas, where demand for orders is high.

Systems and methods herein describe implementation of multiple aggregation depots in a logistics platform to streamline last-mile delivery of on-demand orders of perishable goods. Merchants in a given area may be located within a short distance from a merchant depot. Similarly, a customer depot may be located within a predetermined distance from customers in a given area.

Orders from merchants within the given area are picked up by runners, or merchant couriers, and dropped off at the merchant depot corresponding to the given area of merchants. An agent configured to transfer on-demand perishable goods orders from a merchant location to a merchant depot is referred to herein as a runner or merchant courier. Each merchant may be assigned to a designated merchant courier such that each merchant has at least one merchant courier. However, a merchant courier may be assigned to multiple merchants. Merchant couriers may be assigned or offered delivery opportunities to pick up groups of orders based on their estimated time of completion by the merchant. Merchant couriers may travel to and from merchant locations on foot, or by bicycle, scooter, or other vehicle that can more efficiently navigate the busy area. Because merchant couriers do not have to navigate through automobile traffic or find parking, orders for perishable goods may be efficiently transferred from the merchant locations to a central distribution hub.

In some embodiments, the orders may be grouped or batched into batches for delivery based on destination proximity or generated delivery routes. Another set of couriers, referred to herein as depot couriers, may be implemented to transport orders from the merchant depot to the customer depot. Orders may be further grouped into additional batches at the customer depot and assigned to or paired with delivery couriers to deliver the orders to customers based on the order assignment. As used herein, an order assignment may refer to the pairing of an order with a courier and providing the courier with a delivery opportunity to deliver the order to the corresponding delivery destination, which may be accepted or declined by the courier.

According to various embodiments, the couriers may be human associates. However, one or more couriers in the protocol may comprise an automated drone or vehicle. In some examples, the courier is an autonomous vehicle (AV) that is routed to various merchants based on expected orders and completion times. For example, a merchant may place a perishable goods order or orders into or onto an AV operating as a merchant courier, and the AV proceeds to the next merchant or to the merchant depot.

Personnel, such as a dispatcher, may oversee the aggregated orders and assign the orders to couriers. In some embodiments, a delivery routing system may be implemented in the system to automatically determine travel routes and order assignments for couriers. In some instances, personnel stationed at the depots hand off orders to couriers so that couriers do not need to park or leave their vehicles to pick up or drop off orders. In some embodiments, couriers may be stationed at particular depots allowing for instant handoff of orders.

However, an automated order retrieval system may be implemented in lieu of personnel. For example, an automated locker system may be used to store orders and may be accessed by couriers using authenticating information, such as access codes. In yet further examples, AV couriers may automatically access automated lockers to store and retrieve orders.

Systems described herein can greatly improve efficiency of courier activities, delivery times, and ETA predictions. Because the orders are collected and ready for pickup at aggregation depots, couriers do not have to travel through congested areas to pick up orders from merchants or to deliver orders to customers. Thus, courier time and activity is streamlined. Additionally, the couriers are never at risk of waiting for an order to become ready at the merchant. These systems further optimize deliveries by streamlining order batching reducing the amount of travel and parking required for additional orders. The described protocol requires little to no coordination between couriers, dispatchers, and other personnel.

Furthermore, the division of last-mile delivery activities into segments further improves efficiency. Because each segment is shorter than the total route, couriers travel shorter distances between each designated destinations and are thus able to make more trips and transport more orders within a given amount of time. Shorter predetermined routes also make optimal routes easier to determine and ETA predictions more reliable. Automation of various functions along the last-mile delivery route further enhances reliability, predictability, and efficiency of the system by reducing deviations from human error and behavior. Overall, the orders in the system are delivered more quickly by transporting the orders between depots.

The disclosed systems can be used whenever there exists a need to efficiently dispatch deliveries from merchants to third-party delivery fulfillment services. The systems may work especially well when a high volume of deliveries being produced in a specific region can be expected, and are flexible and lightweight enough to set up for special events, road closures, and other situations that would make normal vehicular transport more difficult.

EXAMPLE EMBODIMENTS

With reference to FIG. 1, shown is an example of a delivery logistics system 100 implemented for multiple merchants, couriers, and customers, in accordance with one or more embodiments. In the present example, the delivery logistics system 100 is managed by a logistics platform for real-time, on-demand, delivery of perishable goods. For instance, a customer may order food from a restaurant by using a mobile device application that places the order through the logistics platform associated with delivery logistics system 100. In some instances, the user may also access the logistics platform through the internet via a computer, laptop, tablet, etc. When the customer orders the food through the logistics platform, the order is prepared at a provider site, where a delivery associate will then pick up the order and delivery the order from the provider site to the customer.

As shown in FIG. 1, system 100 includes providers 100, 112, 114, and 116. According to various examples, a provider may be a merchant that prepares perishable goods such as food at a restaurant. Other such merchants may be any combination of one or more of the following: restaurants, bars, cafes, or other vendor of food or beverages, such as a hotel. Such venues may also be referred to herein as HORECA (Hotel/Restaurant/Café) which is a term or abbreviation used to describe entities in the food service industry.

However, in some examples, provider sites may also provide other perishable goods such as floral arrangements, medications, refrigerated or frozen items, live animals, etc. that may need real-time, on-demand delivery to a customer. Accordingly, although various examples in the present disclosure may describe the provider sites and logistics platform in the context of restaurants and food delivery, the mechanisms and processes described herein may also be applied to the delivery of various other perishable items. As used herein, the terms "provider" and "merchant" may be used interchangeably.

System 100 also includes one or more couriers 120, 122, 124, 126, and 128. Such couriers may be on foot, or traveling by vehicle, such as a car, scooter, bicycle, etc. In some embodiments, the couriers may correspond to autonomous vehicles (AV) which may travel autonomously to and from designated locations. In various embodiments of system 100, one or more couriers may be directed to one or more merchants to receive an order placed by customers and deliver the orders to the customers located at corresponding destinations 130, 132, 134, or 136, which may be residential or commercial addresses. In some embodiments, the destinations may correspond to a particular geo-location determined by GPS or other coordinate system.

In various embodiments, the logistics platform may determine the estimated time arrival (ETA) of delivery of the order to the customer once the order has been placed. This ETA may be provided to the customer. The ETA of delivery of an order may be estimated based on tracked events or milestones corresponding to the order. As used herein, the terms "events" may be used interchangeably with "milestones." The customer may also be provided with information regarding the status of the order, events, or milestones. The customer may also be provided with other information, such as information corresponding to the courier, etc. Information regarding the status of the order, events, or milestones may also be provided to the merchants and the couriers.

Figure 2:
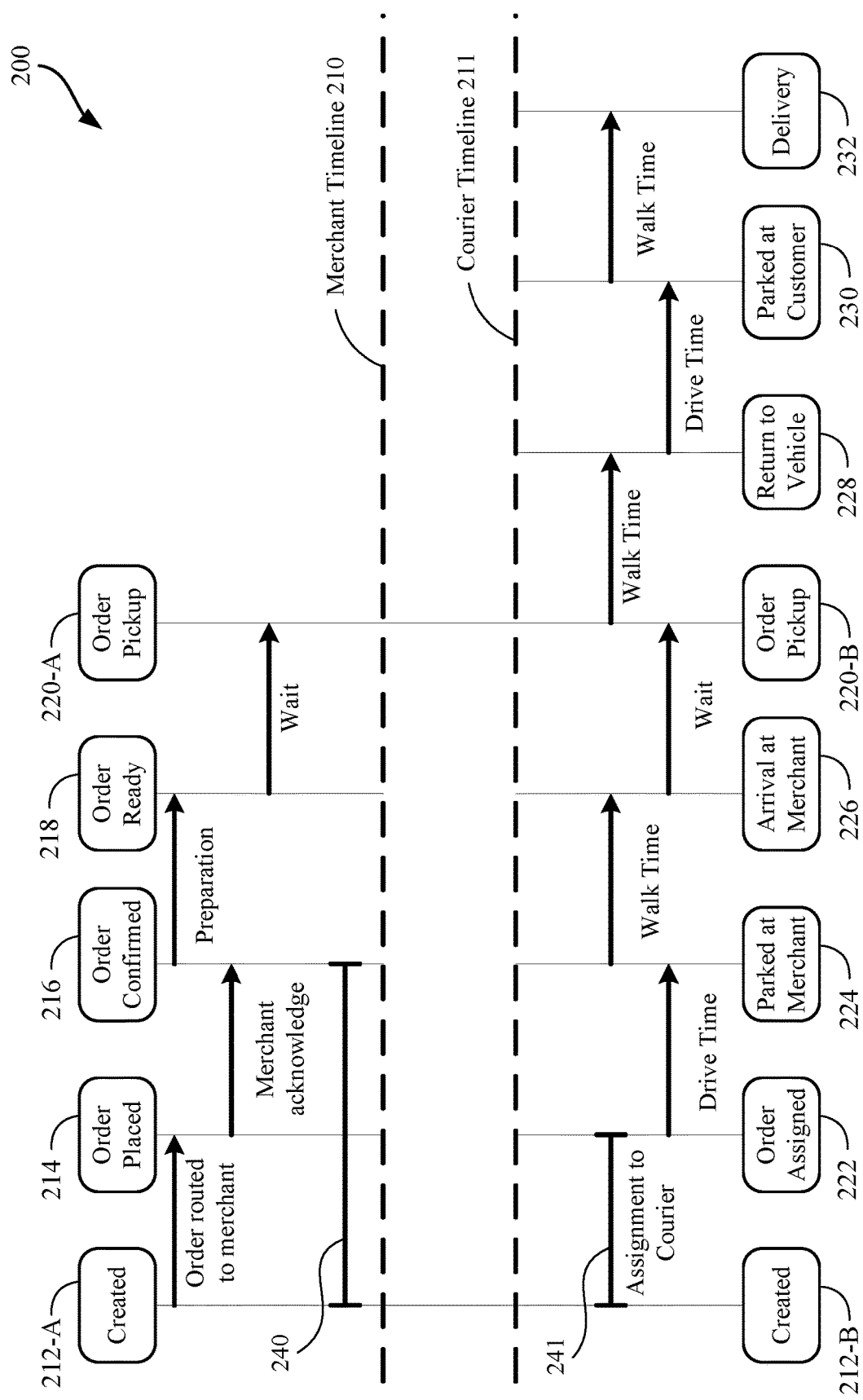
FIG. 2 illustrates an example timeline of delivery events associated with real-time on-demand delivery of perishable goods, in accordance with one or more embodiments.

With reference to FIG. 2, shown is an example timeline 200 of delivery events associated with real-time on-demand delivery of perishable goods, in accordance with one or more embodiments. Timeline 200 depicts the various events that occur when an order is placed by a customer on a merchant timeline 210 and a courier timeline 211. In various embodiments, a merchant timeline or courier timeline may include additional or fewer events than depicted in FIG. 2. In various embodiments, the events in timeline 200 may be tracked via transmission between a server of a delivery routing system and client devices associated with one or more couriers, merchants, and/or customers, which may be further described with reference to FIG. 9. As used herein, client devices associated with customers may be referred to as "customer devices," client devices associated merchants may be referred to as "merchant devices," and client devices associated with couriers may be referred to as "courier devices." The server system may implement a dynamic ETA estimation system as further described herein. Notifications or confirmations of one or more events described in this specification may be transmitted by the delivery routing system to one or more client devices. Such notifications and confirmations may allow users to track deliveries of orders, as well as provide routing instructions to various personnel, including couriers.

Various other methods of generating dynamic ETA predictive updates using neural networks are described in U.S. patent application Ser. No. 15/798,207 titled SYSTEM FOR DYNAMIC ESTIMATED TIME OF ARRIVAL PREDICTIVE UPDATES by Han et al., filed on Oct. 30, 2017, which application is incorporated by reference herein in its entirety and for all purposes.

The events that occur on a merchant timeline 210 may include order creation 212-A, order placement 214, order confirmation 216, order ready 218, and order pickup 220-A. An order creation 212-A may occur when the system receives an order message created by a customer. The order message may be received at the server system and may include order information such as ordered items, merchant information, customer information, order total, etc. The order information may then be routed to the designated merchant. In some embodiments, the order information is routed to the designated merchant by transmitting information corresponding to the order from the server to a merchant device.

The order placement 214 event may occur when the order information is received at the merchant device. In some embodiments, the merchant may acknowledge the receipt of the order information by transmitting a confirmation, which may trigger the order confirmation 216 event. In some embodiments, order placement 214 occurs when the merchant transmits confirmation of receipt of the order information. Order confirmation 216 may signal that preparation of the order has begun by the merchant. In some embodiments, the period of time between order creation 212-A and order confirmation 216 is known as kitchen latency 240.

An order ready 218 event may then occur when preparation of the items in the order is completed and the order is ready for pickup by a courier. Event 218 may be triggered by a merchant confirmation that the order is ready. Such confirmation may be transmitted by the merchant device to the server. The merchant may then wait for a courier to arrive for pickup of the order. When a courier arrives and picks up the order, the order pickup 220-A event occurs. This event may be triggered by a courier confirmation that the courier has received the order. This event may also be triggered by a merchant confirmation that the courier has received the order.

In some embodiments, the events that occur on a courier timeline 211 may overlap or correspond with one or more events on a merchant timeline 210. The events on courier timeline 211 may include order creation 212-B, order assignment 222, parked at merchant 224, arrival at merchant 226, order pickup 220-B, return to vehicle 228, parked at customer 230, and order delivered 232.

In some embodiments, order creation 212-B may correspond to order creation 212-A, and may occur when the system receives an order message created by a customer as in event 212-A. In some embodiments, event 212-A and 212-B may be the same event. The system may then assign the order to a courier, thereby triggering order assignment 222. In some embodiments, order assignment 222 may be triggered by confirmation of acceptance of the order assignment by the courier. The system may transmit a notification to a courier device corresponding to the courier. In some embodiments, the period of time between order creation 212-B and order assignment 222 may be known as assignment latency 241.

When order assignment 222 occurs may depend on various factors, including the distance of the courier from the merchant, the travel time of the courier to the merchant, traffic, time of day, etc. In some embodiments, order assignment 222 may not occur until the order information has been confirmed by the merchant at 216 or the order is being prepared by the merchant. In some embodiments, order assignment 222 may not occur until the merchant has confirmed that the order is ready for pickup at 218.

Once an order is assigned at 222, the courier may travel to the merchant location to pick up the order. The courier may then pick up the order upon arrival at the merchant location, and trigger order pickup 220-B. Event 220-B may correspond to order pickup 220-A. In some embodiments, event 220-A and 220-B may be the same event. In some embodiments, event 220-B may be triggered by a courier confirmation that the courier has received the order from the merchant. This event may also be triggered by a merchant confirmation that the courier has received the order.

In some embodiments, the system may attempt to assign orders and route couriers such that the arrival at merchant event 226 coincides with the order ready event 218. This may optimize or improve the efficiency of the actions of the courier and the merchant to minimize down time, which may occur where courier arrives before the merchant has completed the order, or where the merchant has completed the order before the courier arrives.

In some embodiments, additional events may be tracked between the order assignment 222 and the arrival at merchant 226. For example, the courier may travel to the merchant location by vehicle and then park her vehicle in an appropriate location to reach the merchant. In some embodiments, the courier may confirm that the vehicle is parked by transmitting the confirmation from the courier device to the server, thereby triggering parked at merchant 224. The courier may then walk or otherwise travel from the parking location to the merchant. An arrival at merchant event 226 may also occur once the courier has arrived at the merchant location. A confirmation of the courier's arrival may be sent by the courier device and/or the merchant device. In various embodiments, tracking these additional events may provide more accuracy of ETA predictions between order assignment 222 and arrival at merchant 226.

In some embodiments, the courier may have to wait for the order to be completed. After order pickup 220-B, the courier may then travel to the customer location to complete delivery of the order at order delivery 232. Order delivery 232 may occur when the order has been given to the customer. Order delivery 232 may be triggered by confirmation of the delivery by the customer or the courier via corresponding devices.

In some embodiments, additional events may be tracked between the order pickup 220-B and the order delivery 232. For example, the courier may confirm the return to a vehicle event 228 after order pickup event 220-B at the merchant location. This may be done via confirmation transmitted from the courier device to the server.

In various embodiments, various events may be tracked based on detection of a courier's location using locations sensors or proximity beacon. The systems used to determine the location of a courier may implement wireless communication signals, such as Bluetooth Low Energy (BLE) beacons and BLE-enabled devices that are capable of detecting signals emitted by the BLE beacons. Various systems and processes for determining the location of a courier using proximity sensors and/or beacons are described in U.S. patent application Ser. No. 15/826,737 titled IMPROVING PREDICITONS BY USING BEACONS IN A REAL-TIME LAST MILE LOGISTICS PLATFORM by Hsieh et al., filed on Nov. 30, 2017, which application is incorporated by reference herein in its entirety and for all purposes.

For example, a beacon may be installed in the courier's vehicle. When the courier and corresponding device are within a predefined distance from the beacon, the beacon may communicate with the courier device to automatically detect when the courier is near or at the vehicle. When the courier and corresponding device are beyond the predefined distance, the communication between the beacon and the courier device may be broken to automatically indicate that the courier is no longer near or at the vehicle. The location of the courier may then be transmitted to the delivery routing system via the beacon or the courier device.

Although U.S. patent application Ser. No. 15/826,737 describes systems and processes implementing BLE signals, it should be understood that automated event tracking systems and processes may implement other wireless transmission signals and technologies including but not limited to, Wi-Fi, passive and active radio frequency identification (RFID) signals, cellular data, mobile-satellite communications, as well as low-power wide-area networks (LPWAN) and global position system (GPS) location systems.

By using BLE beacons and devices, the system can provide more accurate location information of a delivery associate and can avoid the drawbacks of GPS, cell tower triangulation, and manual location entry. Specifically, the system can be used when there are weak or nonexistent GPS or cell signals. The system also detects location automatically without requiring any input from a courier or other user. Thus, events may be automatically triggered based on tracked locations, even in situations where the courier forgets to transmit a confirmation of the event. As described in examples of various mechanisms and processes herein, the use of BLE beacons and BLE-enabled devices to provide location services yields increased efficiency and accuracy, in addition to other benefits, for a logistics platform managing real-time, on-demand delivery of perishable goods.

In yet another example, the courier may then park her vehicle in an appropriate location to reach the customer. In some embodiments, the courier may confirm that the vehicle is parked by transmitting the confirmation from the courier device to the server, thereby triggering parked at customer event 230, similar to the parked at merchant event 224. The courier may then have to walk or otherwise travel from the parking location to the customer location. An arrival at customer event (not shown) may also occur when the courier has arrived at the customer location before delivery of the order.

In various embodiments, the tracking of events or milestones may provide guidance to an assignment or routing algorithm to efficiently route couriers. For example, generating ETA predictions for various events, as described above, may allow for more optimal, efficient, or convenient assignment of couriers for on-demand delivery of perishable goods originating from third party merchants which require specific points of acknowledgement.

In some embodiments, merchants may be located in an area with high congestion caused by vehicle or foot traffic. Certain locations may also have insufficient parking. For example, in dense commercial areas, it is often difficult for couriers to both travel and find parking which makes it difficult to pick up orders and complete deliveries quickly. These scenarios may cause inaccuracies in ETA predictions, or cause time durations between particular events to increase resulting in inefficiencies in routing deliveries and prolonged delivery times.

For example, a merchant may indicate an order ready event 218 for an order. Ideally, a courier will have parked at merchant 224 and arrived at merchant 226 to pick up the order shortly before or after the order ready event 218. However, in an area with high traffic congestion, the courier may be forced to travel slower, or may not be able to find parking, causing the drive time between order assigned event 222 and parked at merchant event 224 to be longer. Additionally, a courier may be forced to park a longer distance away from the merchant location, causing the walk time between parked at merchant event 224 and arrival at merchant event 226 to be longer. After an order pickup event 220-B by the courier, another prolonged walk time to return to vehicle event 228 may also occur in this example scenario.

Figure 3:
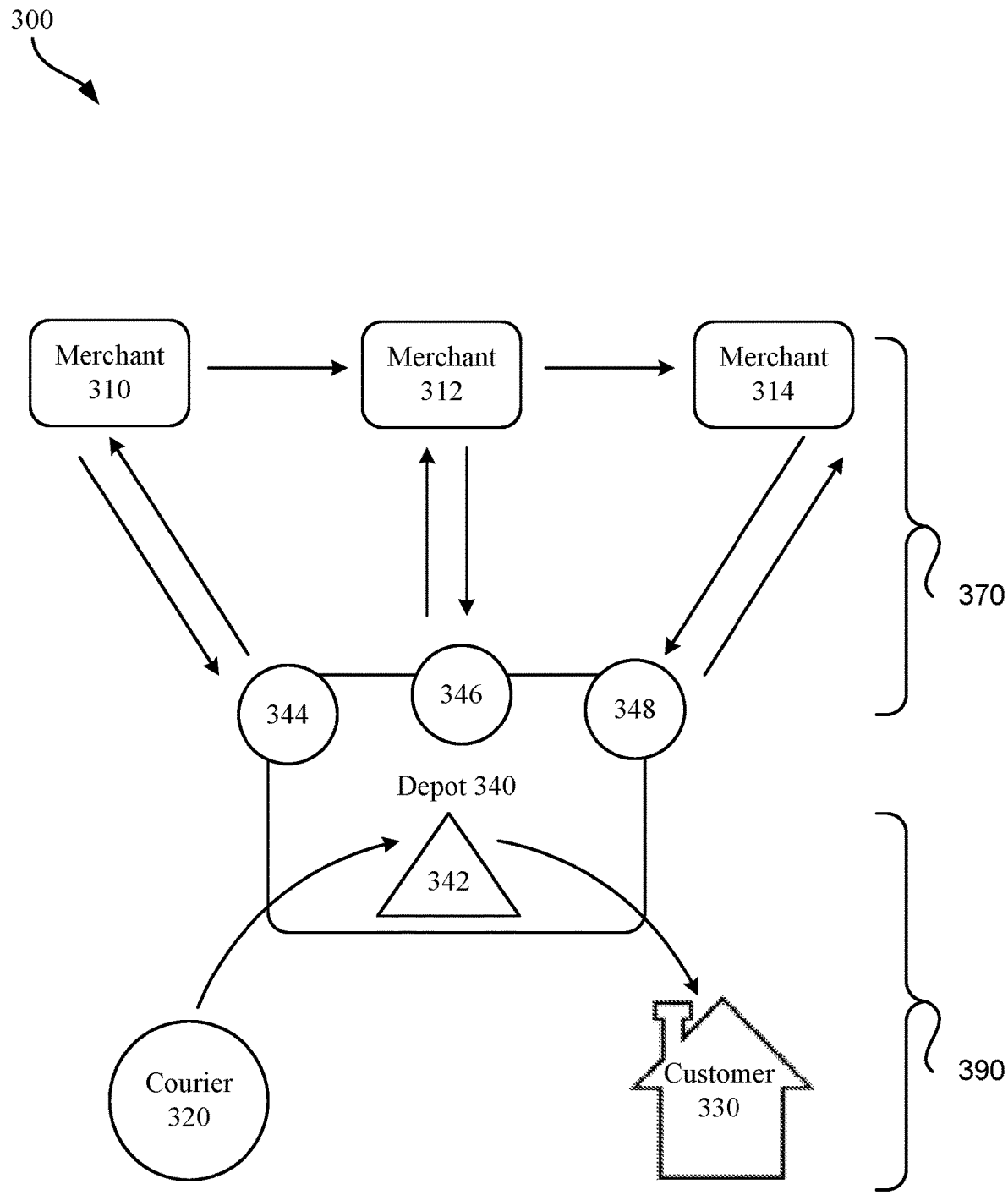
FIG. 3 illustrates an example of a delivery logistics system utilizing a depot dispatch protocol for pairing runners and couriers to deliveries from merchants to customers, in accordance with one or more embodiments.

By implementing a depot dispatch protocol with aggregation depots for assignment of deliveries, courier travel times and other activities may be streamlined to make deliveries of perishable goods more efficient. The depot dispatch protocol described herein will also result in more consistent and accurate predictions for ETAs of order deliveries. With reference to FIG. 3, shown is an example of a delivery logistics system 300 utilizing a depot dispatch protocol for pairing runners and couriers to deliveries from merchants to customers, in accordance with one or more embodiments.

Like system 100, system 300 may include customers, merchants, and couriers. As shown in FIG. 3, system 300 includes merchants 310, 312, and 314, courier 320, and customer 330. In some embodiments, merchants 310, 312, and 314 may be any one of merchants described with reference to FIG. 1. In some embodiments, courier 320 and customer 330 may be any one of couriers or customers described with reference to FIG. 1. In various embodiments, system 300 may include additional or fewer merchants, couriers, and/or customers than shown in FIG. 3. As used herein, couriers delivering orders from an aggregation depot to customers, such as courier 320, may be referred to herein as delivery couriers.

In addition, system 300 further includes an aggregation depot 340 with dispatcher 342. Aggregation depot 340 may function as a hub for storing orders, batching orders, and routing couriers. In some embodiments, one or more runners 344, 346, and 348 may be stationed at depot 340. In various embodiments, depot 340 corresponds to a predetermined area that has been identified as having high congestion due to vehicle or foot traffic. In some embodiments, various merchants may be located within a predetermined radius of depot 340. For example, depot 340 may be within one (1) mile from each merchant in the corresponding high traffic area.

In some embodiments, runners 344, 346, and 348 may be assigned to travel to one or more merchants to pick up orders that have been confirmed as ready. Runners transporting orders from merchants to aggregation depots may also be referred to herein as merchant couriers. In some embodiments, each merchant may be designated a particular runner. For example, runner 344 may be assigned to merchant 310, runner 346 may be assigned to merchant 312, and runner 348 may be assigned to merchant 314. However, in some embodiments, a courier may be assigned to pick up orders from more than one merchant. In various embodiments, runners may travel to the assigned merchant on foot. However, in other embodiments, runners may also travel via other means, including skateboards, scooters, bicycles, or other powered or unpowered transportation devices.

In FIG. 3, runner route 370 and courier route 390 are depicted. In various embodiments, a runner may travel to its designated merchant to pick up orders as their preparation is completed. In some embodiments, the runner may travel to multiple merchants to pick up multiple orders based on timing of orders and/or distance between merchant locations. The route of a particular runner may be determined by a delivery routing system. The runner may then return to the depot 340 to drop off the order with dispatcher 342. The orders may be grouped into batches of one or more orders by the delivery routing system. A batch of orders may be assigned to courier 320 which can pick up the batch at depot 340 to deliver to customer 330.

Figure 4:
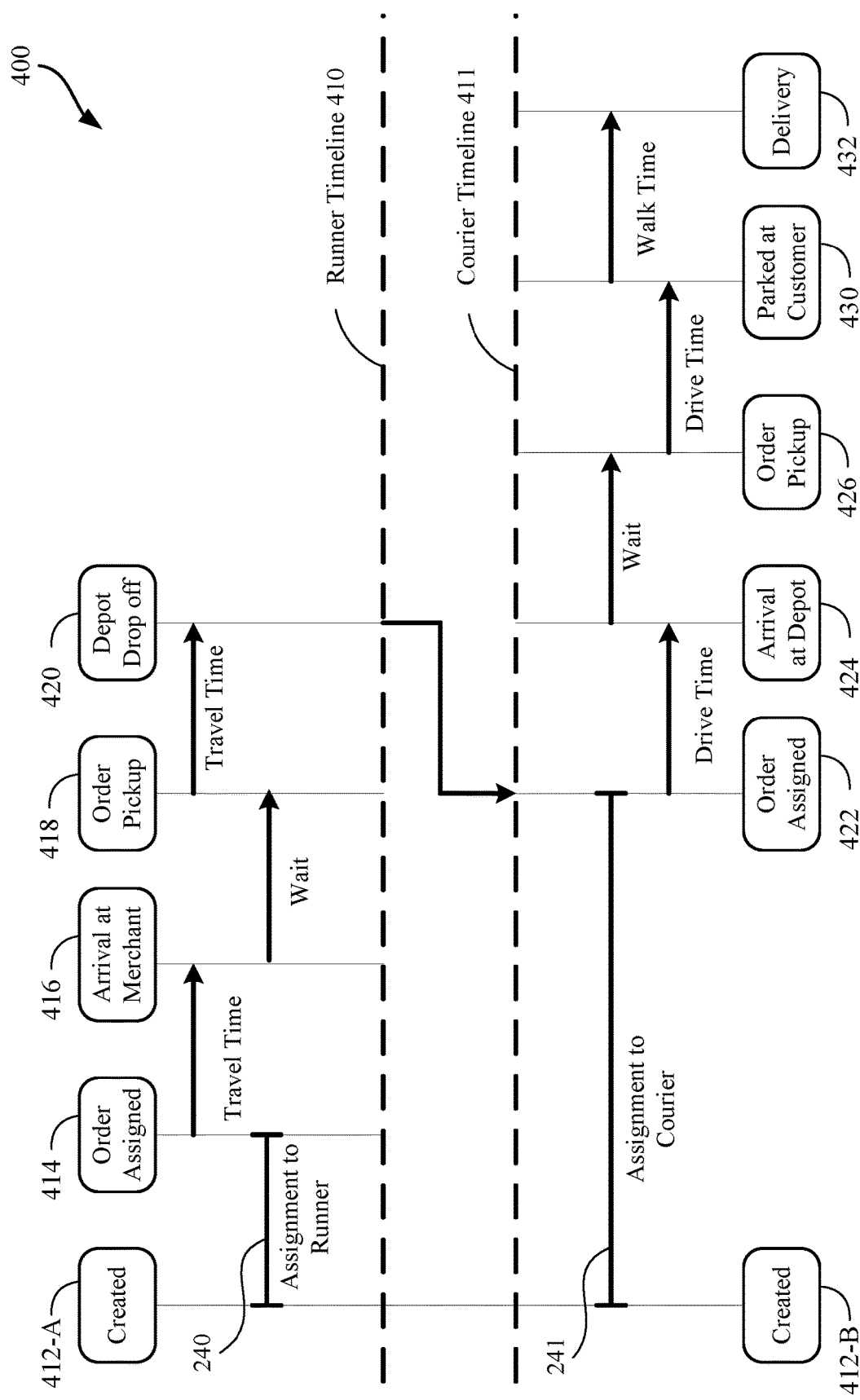
FIG. 4 illustrates another example timeline of delivery events associated with real-time on-demand delivery of perishable goods, in accordance with one or more embodiments.

With reference to FIG. 4, shown is another example timeline 400 of delivery events associated with a depot dispatch protocol, in accordance with one or more embodiments. In some embodiments, the depot dispatch protocol may be implemented through system 300. Timeline 400 illustrates how, in some embodiments, the implementation of a depot dispatch system may organize or optimize courier activity, and thereby improve delivery efficiency of a system. In various embodiments, timeline 400 depicts the various events that occur when an order is placed by a customer on a runner timeline 410 and a courier timeline 411. In some embodiments, timeline 400 may also run concurrently with merchant timeline 210. In various embodiments, a runner timeline or courier timeline may include additional or fewer events than depicted in FIG. 4. As previously described, the events in timeline 400 may be tracked via transmission between a server system and a client devices associated with one or more couriers, merchants, and/or customers, which may be further described with reference to FIG. 9.

The events that occur on a runner timeline 410 may include order creation 412-A, order assignment 414, arrival at merchant 416, order pickup 418, and depot drop off 420. The events that occur on courier timeline 411 may include order creation 412-B, order assignment 422, arrival at depot 424, order pick up 426, parked at customer 430, and order delivery 432.

An order creation 412-A or 412-B, like order creation 212-A, may occur when the system receives an order message created by a customer and may include order information such as ordered items, merchant information, customer information, order total, etc. The order information may then be routed to the designated merchant, such as merchant 310, and placed, such as at event 214. The order may also be assigned to a designated runner, such as runner 344, corresponding to the particular merchant. An order assignment may be sent from a server to a client device corresponding to the runner, such as a runner device. In other embodiments, the order assignment may be sent to a client device corresponding to the dispatcher 342, such as a dispatch device. The dispatcher 342 may then dispatch a runner to pick up the completed order from the merchant.

The order assigned event 414 may occur upon acknowledgement of the order assignment by runner 344 or dispatcher 342. In some embodiments, runner 344 or dispatcher 342 may acknowledge the order assignment by transmitting a confirmation via the corresponding client device. The runner 344 may then travel to the location of merchant 310 as the order is confirmed at event 216 and/or being prepared by merchant 310.

The arrival at merchant event 416 may occur when the runner 344 arrives at the location of merchant 310. In some embodiments, runner 344 may transmit a confirmation of arrival via the runner device. As previously described, the arrival of runner 344 may alternatively, and/or additionally, be automatically acknowledged using BLE-enabled beacons and devices.

In some embodiments, the courier may have to wait for the order to be completed before order pickup event 418 if arrival at merchant 416 occurs before order ready event 218. However, the system may attempt to assign orders and route runners such that the arrival at merchant event 416 coincides with order ready event 218. This may optimize or improve the efficiency of the actions of the runner and the merchant to minimize down time, which may occur where runner arrives before the merchant has completed the order, or where the merchant has completed the order before the runner arrives.

In some embodiments, runners may be assigned to pick up multiple orders from a single merchant. In some embodiments, runners may be scheduled to arrive at a merchant location when multiple orders are estimated to be ready at event 218. The runner may then pick up all the assigned orders at event 418. Like order pickup events 220-A and 220-B, order pickup event 418 occur upon confirmation that the runner has received the order items from the merchant, which may be transmitted from the runner or the merchant.

In some embodiments, runners may be assigned to pick up additional orders from another merchant. Such orders may be grouped and assigned to runner based on the proximity of the first restaurant to the second restaurant and/or a generated route assigned to the runner. Such grouping may be determined by the delivery routing system.

After order pickup event 418, runner 344 may then travel back to depot 340 to drop off the order. Once the order is dropped off, runner 344 may transmit a confirmation of depot drop off event 420. In some embodiments, dispatcher 342 may transmit the confirmation of depot drop off event 420.

Because runners are not traveling in automobiles, there is no need for them to park or spend time finding parking. Additionally, the runners may be able to travel quickly to any merchant in the predetermined high traffic area because the merchants are all located within a predetermined radius of the depot 340. Thus, runners may be able to reach a merchant location to pick up an order much more efficiently than delivery courier 320.

Multiple orders may be picked up by runners and aggregated at depot 340. In some embodiments, the orders may be grouped into batches based on destination and time of depot drop off 420. In various embodiments, the orders may be grouped by a delivery routing system or by dispatcher 342. Each batch of orders may include one or more orders.

Once the orders have been grouped, the batches may be assigned to a delivery courier, such as courier 320 at order assigned 422. In some embodiments, the order assigned event 422 may occur upon acknowledgement of the order assignment by the delivery courier via a corresponding courier device. Delivery courier 320 may then travel to depot 340. Upon arrival of courier 320, the courier may transmit a confirmation of arrival to trigger arrival at depot 424. Alternatively, and/or additionally, the arrival of delivery courier 320 may be automatically tracked using BLE beacons and devices. Upon arrival at depot 424, the delivery courier may pick up the assigned order or batches from dispatcher 342. In some embodiments, additional runners or other personnel may be available to hand off orders such that couriers do not need to park or leave their vehicles at depot 340. In some embodiments, one or more couriers 344 may be already located at depot 340 on standby. This may allow immediate assignment and transfer of orders to a courier once an order is dropped off at the depot.

In other embodiments, orders may be located in assigned lockers or other storage for couriers to locate and pick up. For example, some embodiments, may replace dispatcher 342 with an automated system of order retrieval. A smart locker system or automated storage system may be implemented to temporarily store the orders which may be accessed upon authenticating the courier. This would eliminate the need for a dispatcher to oversee the depot and thereby reduce labor and improve efficiency.

In some embodiments, additional orders may be grouped into batches that have already been assigned to delivery couriers. For example, one or more orders may be assigned to couriers before the orders are grouped into batches. As more orders are dropped off by runners, such orders may then be assigned to couriers as additional deliveries. This may optimize the activity of the courier to minimize downtime. For example, by assigning an order to a courier 320 before grouping, the courier 320 may be directed to head toward depot 340 as runner 344 is traveling toward depot 340 such that arrival at depot event 424 occurs at the same time or shortly after depot drop off event 420 to minimize the wait time between arrival at depot event 424 and order pickup event 426.

Courier 344 may then travel toward the location of one or more customers, including customer 330 to complete delivery of the order at order delivery event 432. Order delivery event 432 may occur when the order has been given to the customer 330. Order delivery event 432 may occur upon confirmation of the delivery by the customer or the courier via corresponding devices.

As previously described, additional events may be tracked between the order pickup event 426 and the order delivery event 432. For example, the courier may confirm parking the vehicle near the customer location. This may be done via confirmation transmitted from the courier device to the server. In some embodiments, confirmation may be manually input or automatically detected via a BLE proximity beacon.

The systems described herein greatly improve courier efficiencies. Because couriers do not have to travel through congested areas to pick up orders from merchants, courier time and activity is streamlined. The protocol also introduces a delivery handoff system that does not require couriers to spend time looking for parking or even to park at all. This protocol also addresses the low efficiency of deliveries in high congestion areas by creating aggregation depots that function as "instant pickup points." Since all orders are ready for pickup at the depot, couriers are never at risk of waiting for an order to become ready at the merchant.

These systems further improve delivery efficiency by streamlining order batching. Since orders are aggregated from different stores into one pickup location, couriers do not have to travel to another merchant to for batched orders. This makes the batching process more efficient because couriers do not require another leg of travel and parking for additional orders, allowing couriers to make multiple deliveries along a more efficient route.

This protocol may also offer advantages over embodiments where runners were stationed at the merchant location to bring orders to couriers for curbside pickup. In such embodiments, couriers may still need to navigate through busy streets, which may cause downtime and waiting by the stationed runner. Instead, the described protocol requires little to no coordination between couriers, dispatchers, and runners. Their individual responsibilities are well-defined and there is very little friction in either hand-off process.

Figure 5A:
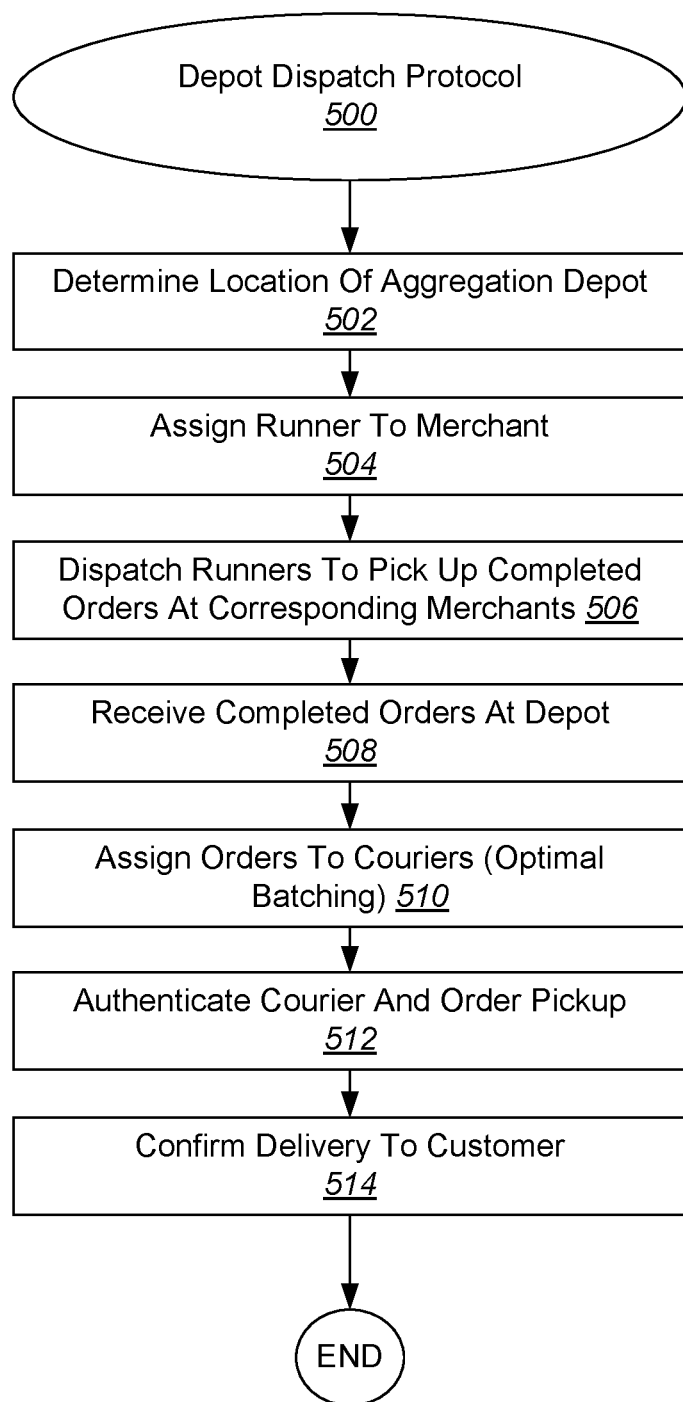
FIG. 5A illustrates an example depot dispatch protocol for pairing runners and couriers to deliveries, in accordance with one or more embodiments.

With reference to FIG. 5A, shown is an example depot dispatch protocol 500 for pairing runners and couriers to deliveries, in accordance with one or more embodiments. In various embodiments, depot dispatch protocol 500 may be implemented for optimizing or improving efficiency of on-demand deliveries. At 502, a location of an aggregation depot, such as depot 340, is determined. The optimal location for an aggregation depot may be based on factors such as traffic congestion, foot traffic, relative location to merchants, ease of accessibility for couriers, delivery density, etc.

At 504, runners are assigned to merchants such that each merchant has at least one designated runner. In some embodiments, a runner may be assigned to multiple merchants. Once orders are placed by customers, the runners are dispatched to pick up completed orders at their assigned merchants at 506. In some embodiments, one or more runners may be assigned to pick up completed orders at more than one merchant location.

At 508, the completed orders are dropped off and received at the depot. A dispatcher, such as dispatcher 342 may acknowledge receipt of an order from a runner. However, in other embodiments, the runner may drop off completed orders at an automated order retrieval system, such as authenticating locker storage units. The runner may then return to the assigned merchant locations to pick up additional orders.

At 510, the orders are assigned to couriers. The dispatcher may assign orders at the depot to nearby dashers via an application on the dispatcher device. In other embodiments, the orders may be automatically assigned by the delivery routing system based on optimal routes and ETA predictions. In various embodiments, optimal batching of orders may be computed to group the completed orders into one or more batches based on various factors, such as delivery location, time of order, types of order items, number of order items, etc. Such grouping may be implemented by a delivery routing system. For example, the delivery routing system may implement a routing algorithm in order to maximize the efficiency of deliveries from the depot to customers. In various embodiments, the routing algorithm may determine whether to assign an order or wait for a potentially more optimal batch including subsequent orders. In some embodiments, the routing algorithm may include neural networks and computer learning algorithms for predicting and determining order groupings and assignments.

Various systems and processes for grouping and assigning deliveries of orders for perishable goods are described in U.S. patent application Ser. No. 15/826,736 titled SYSTEM AND METHOD FOR DYNAMIC PAIRING FUNCTION OPTIMIZATION by Chopra et al., filed on Nov. 30, 2017, which application is incorporated by reference herein in its entirety and for all purposes.

Once an order or group of orders is assigned to a courier, that courier will travel to the depot to pick up the order. At 512, the courier is authenticated and the pickup of the order is confirmed. In some embodiments, authentication of the courier is optional. In some embodiments, authentication of the courier occurs via the confirmation of the courier's receipt of the order items, such as at event 426. In some embodiments, one or more runners may be stationed at depot 340 to hand off assigned orders to the couriers such that couriers need not park their vehicles. In other embodiments, couriers may be directed to the locker location storing their assigned orders and authenticate with the automated storage system to retrieve the assigned orders. Once the assigned orders are collected by the courier, the courier travels toward the customer location to complete the delivery. Delivery of the order to the customer may be confirmed at 514.

Figure 5B:
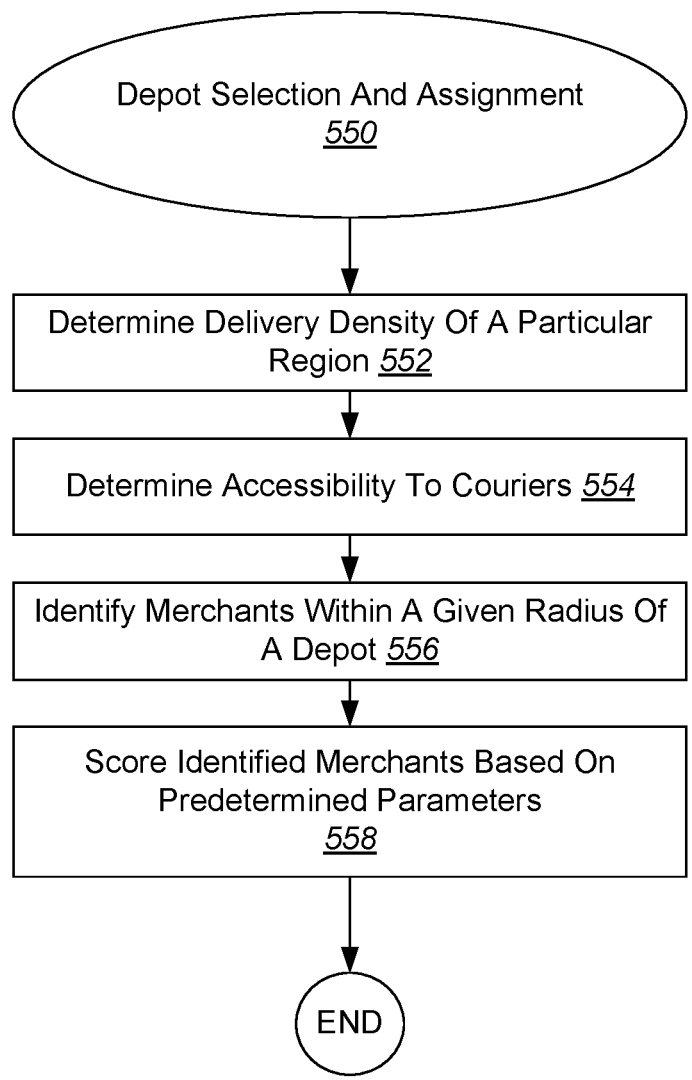
FIG. 5B illustrates an example process for depot selection and placement, in accordance with one or more embodiments.

With reference to FIG. 5B, shown is an example process flow 550 for depot selection and placement, in accordance with one or more embodiments. In some embodiments, process flow 550 may correspond to step 502 in dispatch protocol 500. One or more of the steps of process flow 550 may be optional in various embodiments.

At 552, the delivery density of a particular region is determined. In various embodiments, the operation of an aggregation depot must increase the efficiencies of couriers enough to cover the operational costs of the depots and runners. In other words, the aggregation depot must be located in an area such that increased courier efficiencies will generate additional revenue from increased order deliveries that are greater than or equal to the operational costs of the depot and the runners. Thus, delivery density may be an integral factor.

In various embodiments, determining delivery density may include determining delivery volume in the particular region. This may include the average orders per hour in the particular region. This may include all orders made for all merchants in defined region at a given time. The merchants in a particular region may be referred to herein as "target merchants." In some embodiments, delivery volumes may also be factored into delivery density. This may correspond to the number of deliveries of orders from target merchants at a given time. Low delivery volumes may correspond to difficulty for couriers in traveling to merchant locations to pick up orders. Thus, in some embodiments, regions with delivery volumes below a predetermined threshold may be identified as potential sites for depot placement.

Additionally, order pickup rate may also be factored into delivery density. This may correspond to the ratio of the number of orders picked up to the number of outstanding ready orders at a given time. A lower order pickup rate may also indicate difficulty of couriers reaching merchant location to pick up ready orders. In some embodiments, the average duration between order ready event 218 and order pickup events 220-A or 220-B may be calculated. If the average duration for target merchants is above a predetermined threshold, the region may be identified as a potential site for depot placement.

In some embodiments, average travel times of couriers to target merchant locations may be tracked. For example, the region of target merchants may be defined by a boundary. Historical data may be used to determine the travel times of couriers from the outer border of the boundary to a target merchant location. These travel times may be aggregated and compared to average travel times in other regions. Various other factors may also be considered in determining delivery density and appropriate sites for depot placement.

At 554, the accessibility to couriers is determined. This may be determined to identify the optimal target site to operate a depot. This may be based on the relative foot and vehicle traffic around the location. May consider traffic lights, proximity to landmarks such as schools, churches, etc. A site with less traffic and congestion may be selected because courier vehicles may be able to reach the target site more efficiently. In some embodiments, average travel times of couriers to the target site location. Travel times from the outer border of the boundary to the location may be tracked or predicted. In some embodiments, a target site with an average travel time from the outer border that is above a predetermined threshold may be eliminated from consideration.

At 556, merchants within a given radius of the depot location are identified. In some embodiments, a target site for a depot may require a minimum amount of merchants to be within a predetermined distance of the depot location. The depot should also be reasonably close to a set of target merchants.

At 558, the identified merchants are scored based on predetermined parameters. Such parameters may be weighted and/or scored to generate a score for the target merchants. The target merchants that score above a predetermined minimum threshold may be assigned runners at the corresponding depot.

In some embodiments, the parameters may include food type, average number of orders placed, average price of orders, distance from the depot, etc. In some embodiments, certain merchants may be filtered out by food type. For example, ice cream or other temperature sensitive goods may not be suitable to be stored at the depot. However, in some embodiments, automated order retrieval systems may include refrigerated lockers that may be used to store ice cream and other temperature sensitive goods for couriers to pick up. In some embodiments, a depot may have a maximum amount of merchants that may be assigned to its operation.

Figure 6A:
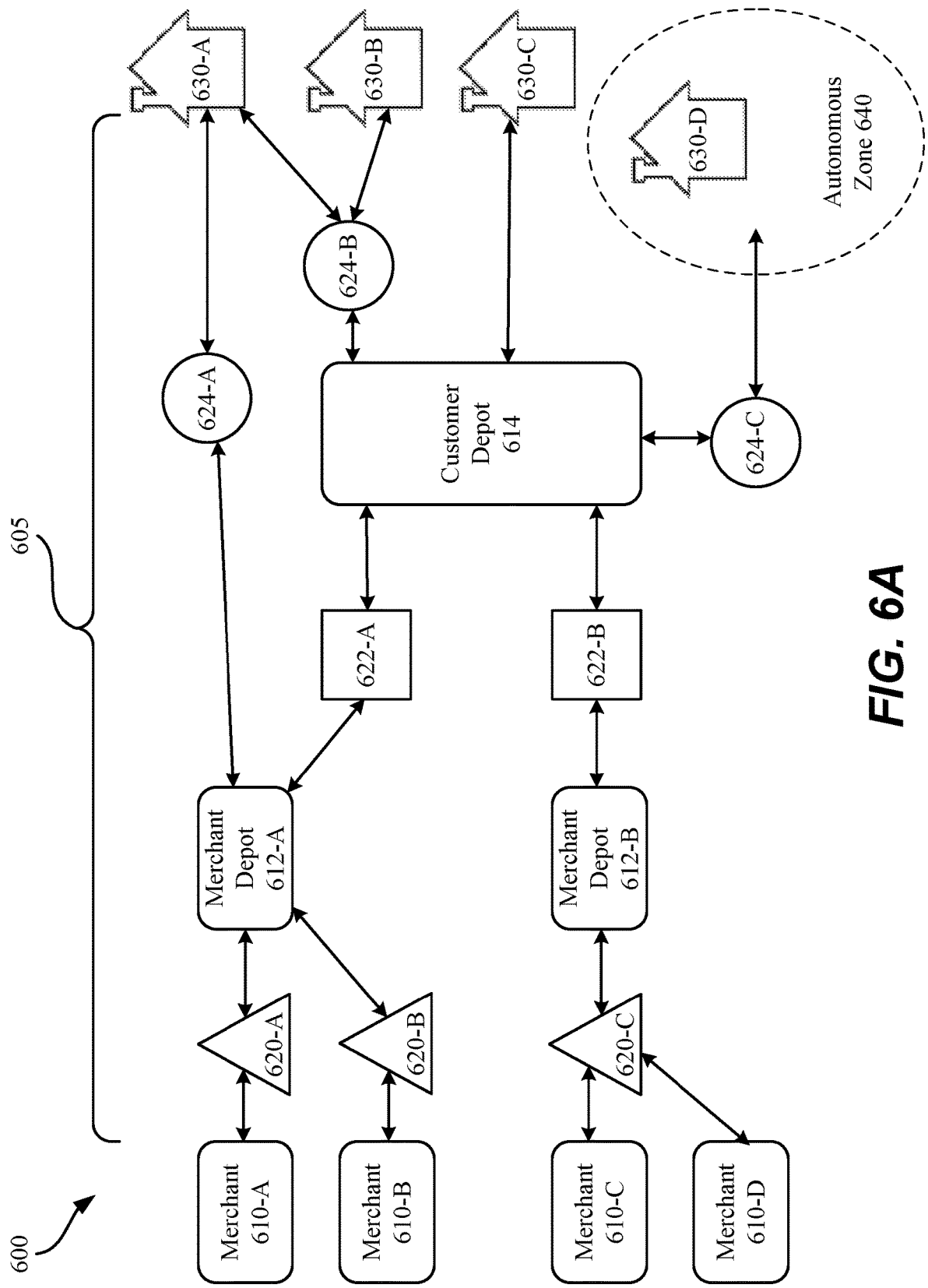
FIG. 6A illustrates an example of a delivery logistics system utilizing multiple delivery depots for real-time on-demand delivery of perishable goods, in accordance with one or more embodiments.

The depot protocol described above can be expanded to implement additional aggregation depots corresponding to predetermined areas of customers in order to further streamline additional activities in the delivery process. With reference to FIG. 6A, shown is a delivery logistics system 600 utilizing multiple delivery depots for real-time on-demand delivery of perishable goods, in accordance with one or more embodiments. In various embodiments, as depicted in FIG. 6A, system 600 may utilize one or more aggregation depots assigned to particular areas of merchants and/or customers to further reduce courier travel times and speed up overall delivery of perishable goods. As will be explained herein and with regards to FIG. 6A, aggregation depots may be further classified as merchant depots or customer depots.

In particular, system 600 is configured to improve scheduling and other logistics of last-mile delivery routes 605. Last-mile delivery generally refers to the movement of goods from a transportation depot or hub to a final delivery destination, which may typically be a personal residence. However, final delivery destinations may also be commercial locations or public areas. As described herein, last-mile delivery may include any of the delivery events described herein.

Like systems 100 and 300, system 600 may include merchants, couriers, and customers. As shown in FIG. 6A, system 600 includes merchants 610-A, 610-B, 610-C, and 610-D, and customers 630-A, 630-B, 630-C, and 630-D. In some embodiments, merchants 610-A, 610-B, 610-C, and 610-D may be any one of merchants described with reference to FIG. 1 or FIG. 3. In some embodiments, customers 630-A, 630-B, 630-C, and 630-D may be any one of customers described with reference to FIG. 1 or FIG. 3. System 600 may further include delivery couriers 624-A, 624-B, and 624-C assigned to deliver orders to customer locations. In some embodiments, delivery couriers 624-A, 624-B, and 624-C may be any one of the couriers described with reference to FIG. 1 or FIG. 3. In various embodiments, system 600 may include additional or fewer merchants, delivery couriers, and/or customers than shown in FIG. 6A.

System 600 may include aggregation depots corresponding to one or more merchants in a predetermined area, like aggregation depot 340 previously described with reference to FIG. 3. As described herein and with reference to FIG. 6A, aggregation depots corresponding to one or more merchants in a predetermined area may also be referred to as merchant depots or merchant hubs. As also previously described with reference to FIG. 3, runners may be assigned to one or more merchants or merchant depots for transporting orders from merchants to the appropriate merchant depot. As described herein and with reference to FIG. 6A, runners assigned to travel between merchants and merchant depots will be referred to as merchant couriers. System 600 may include merchant depots 612-A and 612-B, and merchant couriers 620-A, 620-B, and 620-C. In various embodiments, system 600 may include additional or fewer merchant depots and/or merchant couriers than shown in FIG. 6A.

Each merchant hub may correspond to one or more merchants in a predetermined area. Such predetermined area may have been identified as having high congestion due to limited parking and/or high vehicle or foot traffic, such as via method 5B. As depicted, merchants 610-A and 610-B correspond to merchant depot 612-A and merchants 610-C and 610-D correspond to merchant depot 612-B. Merchants 610-A and 610-B may correspond to a first predetermined area, while merchants 610-C and 610-D may correspond to a second predetermined area. In various embodiments, the first and second predetermined areas may not overlap. In some embodiments, the first and second predetermined areas may overlap with one or more common merchants. In some embodiments, various merchants may be located within a predetermined radius of the corresponding merchant hub. For example, merchant depot 612-A may be within one (1) mile from merchants 610-A and 610-B in the corresponding high traffic area.

Merchant couriers may be assigned to travel to one or more merchants to pick up orders that have been confirmed as ready and deliver the orders to a designated merchant hub. Although merchant couriers may travel via automobile, in various embodiments, merchant couriers may travel to and from the assigned merchant on foot. In some embodiments, merchant couriers may also travel via other means, including skateboards, scooters, bicycles, or other powered or unpowered transportation devices, which may more efficiently navigate the busy area with high traffic and congestion.

In some embodiments, a merchant courier may be assigned to a particular merchant. For example, merchant courier 620-A may be assigned pick up only orders from merchant 610-A, while merchant courier 620-B may be assigned to pick up only orders from merchant 610-B. In some embodiments a merchant courier may be assigned to pick up orders from more than one merchant. For example, merchant courier 620-C may be assigned to pick up orders from merchants 610-C and 610-D. In some embodiments, each merchant courier is assigned to a particular merchant depot. For example, merchant couriers 620-A and 620-B may be assigned to deliver orders to merchant depot 612-A only, while merchant courier 620-C may be assigned to deliver orders to merchant depot 612-B only. However, in some embodiments, a particular merchant courier is assigned to more than one merchant depot. For example, merchant courier 620-B may also deliver orders to merchant depot 612-B. In such examples, a merchant, such as merchant 610-B, may be within multiple predetermined areas corresponding to more than one merchant depot.

As described with reference to FIGS. 3, 4, and 5A, an order may then be transferred to a delivery courier at the merchant depot for delivery to a customer. For example, delivery courier 624-A is depicted as delivering an order from merchant depot 620-A to customer 630-A. As previously described, multiple orders may be aggregated at merchant depots into batches of one or more orders. In some embodiments, the orders may be grouped into batches by the delivery routing system based on delivery destination and time of drop off at the merchant depot. Once batching of orders has been completed, a batch of orders may be assigned to a delivery courier, such as delivery courier 624-A for delivery to the corresponding customers, such as customer 630-A.

To further streamline the last-mile delivery of perishable goods, various embodiments described herein utilize additional aggregation depots corresponding to predetermined areas of customers or delivery destinations. As such, system 600 may further include one or more additional aggregation depots corresponding to a predetermined area that includes one or more customers or delivery destinations. As described herein and with reference to FIG. 6A, such aggregation depots corresponding to one or more customer locations in a predetermined area will be referred to as customer depots or customer hubs.

Such predetermined area of customers may have been identified as having high congestion due to limited parking and/or high vehicle or foot traffic. The predetermined area corresponding to the customers may be strategically defined based on one or more considerations described with reference to process 550. Various other factors, such as population density, order volume, traffic characteristics, average courier travel times, etc. may also be used to determine appropriate locations for customer depots. In an example embodiment, customer depot 614 may located near an area with a high density of potential customers, such as a residential neighborhood, a college campus, or an area with a large number of apartment complexes.

As depicted in FIG. 6A, customer depot 614 corresponds to customers 630-A, 630-B, 630-C, and 630-D. In some embodiments, the various customers may be located within a predetermined radius of the corresponding customer depot 614. For example, merchant depot 612-A may be within one (1) mile from customers 630-A, 630-B, 630-C, and 630-D in the corresponding high traffic area.

In various embodiments, depot couriers transport order items between merchant depots and customer depots. Such orders or batches of orders may be assigned to depot couriers, such as depot couriers 622-A and 622-B, to transport the orders or batches of orders from merchant depots to customer depots. In some embodiments, depot couriers may travel along predetermined routes between merchant and customer depots.

A depot courier may be assigned to a particular merchant depot or multiple merchant depots. For example, depot courier 622-A may be assigned to only transport orders from merchant depot 612-A to a customer depot, while depot courier 622-B may be assigned to only transport orders from merchant depot 612-B to a customer depot. As another example, merchant courier 622-A may be assigned to transport orders from merchant depots 612-A and 612-B to one or more customer depots. A depot courier may be assigned to a single customer depot or multiple customer depots. For example, depot couriers 622-A and 622-B may be assigned to only deliver orders to customer depot 614. However, in another example, depot courier 622-A may also deliver orders to other customer hubs (not shown).

Once orders have arrived at the customer depot, a delivery courier may be assigned to pick up orders or batches of orders at the customer hub and complete delivery to customers. As shown, delivery courier 624-B picks up orders from customer hub 614 to deliver to customers 630-A and 630-B.

However, in some embodiments, customers may directly retrieve orders from the customer depot. As shown, customer 630-C retrieves their order from customer hub 614 directly without involvement of any delivery courier or other personnel. For example, customer 630-C may receive a notification at a corresponding device from the delivery routing system which includes information such as the storage location of the order in an automated locker system. The customer may also be provided an access code or other authenticating information to access the storage location.

Similar to merchant couriers, in some embodiments, depot couriers and delivery couriers may travel to on foot or other means, including skateboards, scooters, bicycles, or other powered or unpowered transportation devices, in addition to automobiles, which may more efficiently navigate busy areas with high traffic and congestion. For example, there may be limited parking in certain residential areas, such as in busy urban locations.

Figure 6B:
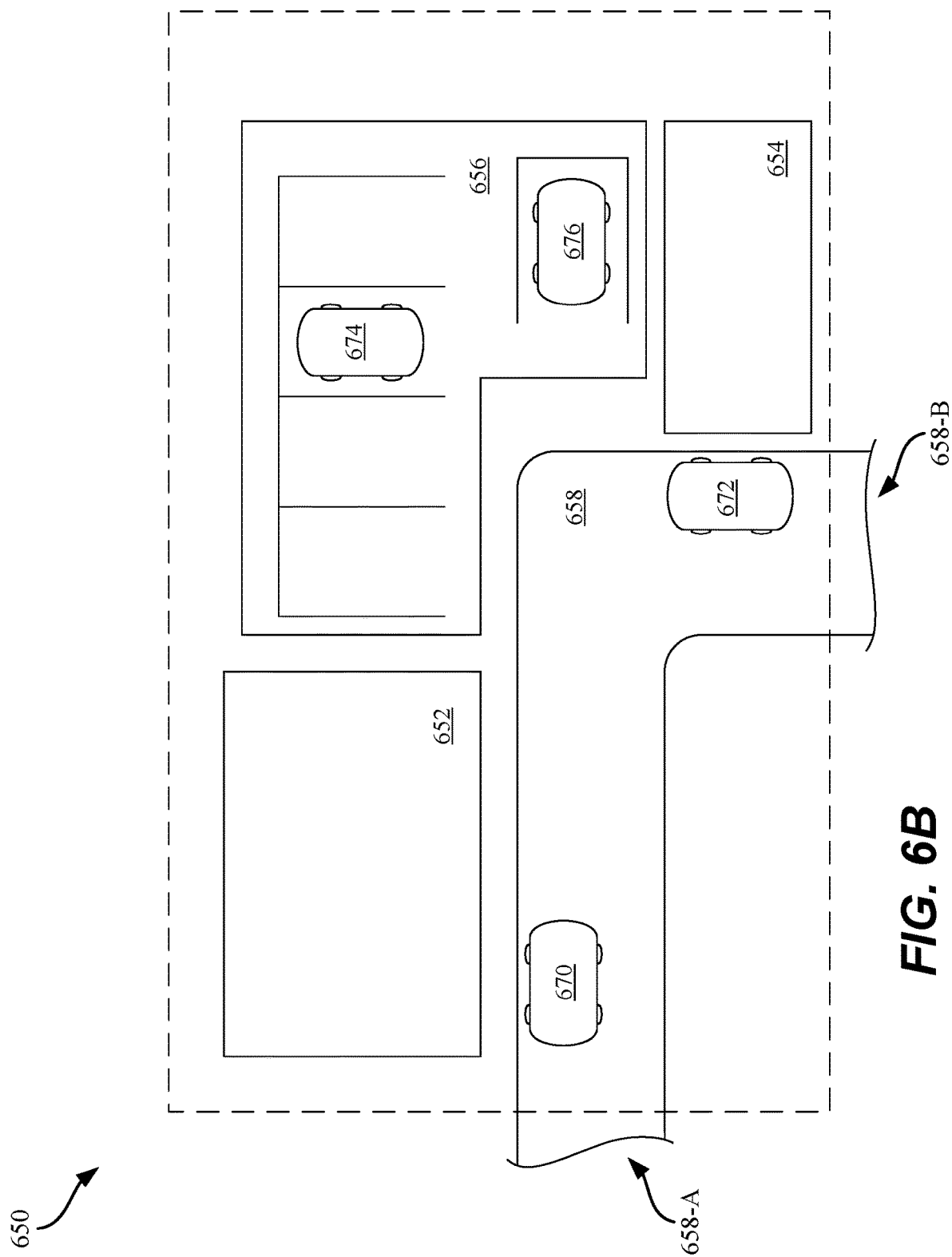
FIG. 6B illustrates another example of an aggregation depot, in accordance with one or more embodiments.

With reference to FIG. 6B, shown is another example of an aggregation depot 650, in accordance with one or more embodiments. In various embodiments, aggregation depot 650 may be a merchant depot or a customer depot. In various embodiments, aggregation depot 650 comprises operations area 652, loading zone 654, parking zone 656, driveway 658, and couriers 670, 672, 674, and 676. Couriers 670, 672, 674, and 676 may be any one of the merchant couriers, depot couriers, or delivery couriers described above.

In various embodiments, operations area 652 and loading zone 654 may include a dispatcher or other personnel to oversee, organize, receive, and transfer orders. In some embodiments, depot personnel may also include other couriers stationed at depot 650. In some embodiments, operations area 652 and loading zone 654 may also be configured with a loading area to store and receive orders. In some embodiments, such loading area may include lockers or other storage areas for receiving and storing the orders.

Having couriers stationed at depot locations allow for immediate assignments and transfer of orders. For example, a depot courier may be stationed at a merchant depot and receive orders directly from merchant couriers. As such, the depot courier would not have to travel to the merchant depot once assigned the order. Furthermore, orders may be stored, aggregated, and batched directly at the depot courier stationed at the merchant depot without having to pass between personnel or other storage locations. A similar delivery handoff arrangement may be implemented with delivery couriers at a customer depot to provide such "instant pickup" of orders from depot couriers.

Couriers 670, 672, 674, and 676 may be couriers traveling on foot or via other suitable transportation methods described herein, including skateboards, scooters, bicycles, or other powered or unpowered transportation devices. In various embodiments, driveway 658 is a road or other pathway that provides access to the aggregation depot for couriers. Driveway 658 may be accessed from a main road, sidewalk, or other pathway by foot or various types of vehicles to enter the aggregation depot. In some embodiments, driveway 658 may be a one way path to allow an unrestricted flow of traffic through the depot. For example, couriers 670 and 672 are depicted in driveway 658. Couriers may enter aggregation depot 650 via driveway 658 at entrance 658-A and exit the aggregation depot at exit 658-B. In some embodiments, driveway 658 may be adjacent to and provide access to operations area 652 or loading zone 654, such as a drive thru.

Parking zone 656 may provide an area for couriers to temporarily park or store their vehicles while loading or unloading orders. Parking zone 656 may also provide an area for housing vehicles corresponding to couriers stationed at the aggregation depot. For example, stationed couriers may park automobiles or store bicycles in between order assignments. In some embodiments, spare vehicles or spare parts may be stored in parking zone 656.

In various embodiments, a dispatcher or other personnel may organize the orders based on batching instructions received from the delivery routing system. In some embodiments, the batched orders may be organized into the same or adjacent locker locations. In other embodiments, couriers may be directed to deposit batched orders into the same or adjacent locker locations by the delivery routing system. In some embodiments, batched orders may be transferred to another loading area for pickup by subsequent couriers or customers. For example, operations area 652 may be designated for receiving orders from couriers, while loading zone 654 may be designated for transferring orders to couriers or customers.

The systems described herein may also utilize automation of one or more elements to further streamline the delivery process, reduce operational costs, and increase accuracy of generated event ETAs. In particular embodiments, an automated locker system may be implemented to store the orders which may be accessed using authenticating information, such as access codes or identification information. In various embodiments, orders may be dropped off at the depots by respective couriers into assigned lockers or other storage systems for the subsequent courier or customer to pick up without the need for additional personnel, such as dispatchers.

The assigned courier or customer may be authenticated using authenticating information. For example, an access code may be manually entered at the locker system or transmitted via wireless communication between client devices and the automated locker system. As another example, the access code may be entered at a corresponding client device and transmitted to the locker system. In some embodiments, the user may use a corresponding client device to scan a barcode, including Quick Release (QR) codes, at the locker to unlock the storage compartment. In some embodiments, the locker system may include a scanner to scan a barcode generated at the client device. This automated system of order retrieval would reduce or eliminate the need for personnel to oversee the depot and thereby reduce labor and improve efficiency.

For example, the delivery routing system may assign an order to a particular locker in loading zone 652. The delivery routing system may then transmit the locker location and an access code to a device corresponding to the courier assigned to deliver the order to the depot 650. Upon arrival at depot 650, the courier may then input the code to access the locker at operations area 652 or loading zone 654 to deposit the order. As another example, the courier may use the corresponding client device to transmit an access request with the access code to the delivery routing system or the locker system to open the designated locker. As yet another example, the courier may select an available locker location to deposit the order and transmit a notification of the locker location to the delivery routing system. A subsequent courier or customer may then be given the locker location by the delivery routing system. The subsequent courier or customer may similarly access the locker by inputting an access code or transmitting an access request. In some embodiments, each courier and customer may be assigned a personal access code and the lockers are configured to respond to the personal access code when assigned.

The system may use any combination of suitable transport means described herein for the various legs of transportation to fit the unique needs of a particular geographic location. In particular embodiments, one or more couriers described herein, including merchant couriers, depot couriers, and delivery couriers, may comprise driverless or autonomous vehicles (AV). As such, one or more various pickup and drop off functions may be automated. In some embodiments, an AV is a self-driving car, unmanned drone, or other vehicle without a human operator. In some embodiments, the AV may be remotely controlled by an operator. Such operator may be stationed at an aggregation depot or other designated location.

For example, an AV may comprise a motor with a suitable power source, such as a battery, gasoline, or other fuel. The AV may further comprise a sensor module for receiving visual and other input to be utilized by an onboard computer or operator to maneuver the AV and control additional functions described herein. The AV may further comprise a cargo compartment for storing orders of perishable goods and other items.

In various embodiments, the storage compartment may be locked or secured. The storage compartment may be accessed by a user, such as merchants, couriers, or customers, using authenticating information. In some embodiments, an access code may be entered at a user interface on the AV. In some embodiments, the access code may be entered at a corresponding client device and transmitted to the AV. In some embodiments, the user may use a corresponding client device to scan a barcode, including Quick Release (QR) codes, on the AV to unlock the storage compartment. In some embodiments, the AV may include a camera for scanning a barcode generated at the client device. In yet further embodiments, the client devices may wirelessly communicate with the AV to unlock and access the storage compartment such as via Wi-Fi, Bluetooth, or RFID. In some embodiments, the system may utilize wireless beacons to unlock the storage compartment when is determined that the AV has arrived at a particular location, such as a merchant location or depot.

In some embodiments, the delivery routing system may transmit order information to the onboard computer, such as order items, ETAs for various delivery events, merchant information, customer information, routing information, etc. In some embodiments, the delivery routing system or the onboard computer determines when the AV should travel to and arrive at each assigned location. In some embodiments, a particular route is determined by the delivery routing system or the onboard computer based on information such as the received order information, traffic information, date and time information, and other input received through the AV's sensors.

In some embodiments, the route is determined in real-time. In some embodiments, the AV may travel along a fixed predetermined route to and from assigned locations. Traveling a fixed predetermined route by an AV provides for improved ETA predictions because potential deviations from route guidance are reduced as compared to a human courier who may vary the travel route from time to time. Since the route is fixed and known by the delivery routing system, fewer variables will affect the various ETA predictions for the AV, such as variability among different human operators including decisions, errors, etc. A predetermined route may also reduce processing resources, programming information, and data needed for the onboard computer of the AV. Predetermined routes will also promote safety because other pedestrians and commuters will expect the AV on a particular road and have an increased awareness of such AVs. Additionally, use of AVs may allow for more continuous tracking of location and speed to improve ETA predictions by solving the problem of failure to confirm events by human error.

In various embodiments, an AV may be configured to navigate along pedestrian pathways and/or other vehicle pathways. For example, an AV may be configured with dimensions to appropriately and safely travel along pedestrian pathways, including sidewalks, wheelchair ramps, and crosswalks. An AV may also be configured to enter merchant or customer locations through doorways, garages, cargo areas, and the like. Similarly, the configuration of an AV may allow appropriate travel to and/or into aggregation depots. In some embodiments, a courier AV may, additionally and/or alternatively, be configured to travel along roadways used by motor vehicles or bike lanes, such as with appropriate safety requirements, speed capabilities or visibility requirements.

For example, in particular embodiments, an AV may include a maximum width of 36 inches, a weight between approximately 200-300 pounds, and travel a maximum speed of 18 to 25 miles per hour. As such, a courier AV can navigate through high traffic and congested areas similar to a human merchant courier on foot, bicycle, or other suitable powered or unpowered transportation devices. For example, the AV may travel at appropriate speeds while navigating along a sidewalk or other pedestrian pathways. As another example, the AV may travel at appropriate speeds along a bike lane along a street. As another example, the AV may travel at appropriate speeds along roadways in residential areas.

In some embodiments, personnel at the depot may access the storage compartment of the AV to deposit or receive orders. In various embodiments, the personnel may access the storage compartment with an access code or access request via a corresponding client device. However, in particular embodiments, the AV may be configured to automatically access a storage location in an automated locker system for and load the order from the storage compartment into the locker. For example, the delivery routing system may transmit the location of an assigned locker to the AV, allowing the AV to locate and travel to the assigned locker. In some embodiments, the AV may transmit an access request for a particular locker to the delivery routing system or the automated locker system. In some embodiments, the locker may transmit an access request to unlock and open the storage compartment of the AV. In various embodiments, mechanisms may be installed in the locker or the AV to transport orders between the AV and the locker. Such mechanisms may include robotic arms, conveyer belts, lifts, ramps, etc.

With reference back to FIG. 6A, system 600 may further comprise autonomous zone 640. In various embodiment, autonomous zone 640 may be a designated area of one or more customers, such as customer 630-D. Autonomous zone 640 may comprise a designated customer area in which an AV may travel to and operate in. In some embodiments, AV couriers are used only to deliver orders to an area designated as an autonomous zone. In some embodiments, autonomous zone 640 may correspond to a designated customer area with a historically large number of delivery destinations for orders. For example, autonomous zone 640 may be a college campus, a residential neighborhood, or an area with a number or residential buildings in an urban area. Autonomous zone 640 may be a designated area that is more suitable for operation of an AV. As with the aggregation depots, any one or more considerations from process 550 may be used to determine appropriate locations to designate as autonomous zones. In various embodiments, and autonomous zone may include any one or more of merchants, merchant depots, customer depots, and customers.

In some embodiments, autonomous zone 640 may be a designated area that is configured for operation of an AV. For example, autonomous zone 640 may be an area with slower speed limits, fewer automobiles, highly visible lane lines, installed sensors, high concentration of customer locations, etc. As another example, autonomous zone 640 may correspond to an area that has been mapped by a driverless automobile system. As another example, autonomous zone 640 may include sensors installed in particular areas to aid in navigation of an AV. In some examples, autonomous zone 640 may include navigation lines of different colors or reflectiveness that are detectable by an AV to navigate within the autonomous zone. As such, an AV connected to the driverless automobile system may be able to navigate the roads of autonomous zone 640. In another example, autonomous zone 640 may be reached from customer depot 614 via a predetermined route which would allow an AV to travel to and from autonomous zone 640 with as little potential for deviation from route guidance as possible.

In yet another example, autonomous zone 640 may correspond to a college campus. Typically college campuses have less automobile traffic and more pedestrian walkways. Furthermore, college campuses include more densely packed buildings, such as classrooms, office buildings, dorms, houses, and apartment complexes, which may be occupied by potential customers. In such a setting, an AV would have maximal access to a set of customers and would be able to travel unhindered and more safely at slower speeds. In some embodiments, a customer depot may be located within an autonomous zone. For example, customer depot 614 may be located on a college campus comprising autonomous zone 640.

Figure 7:
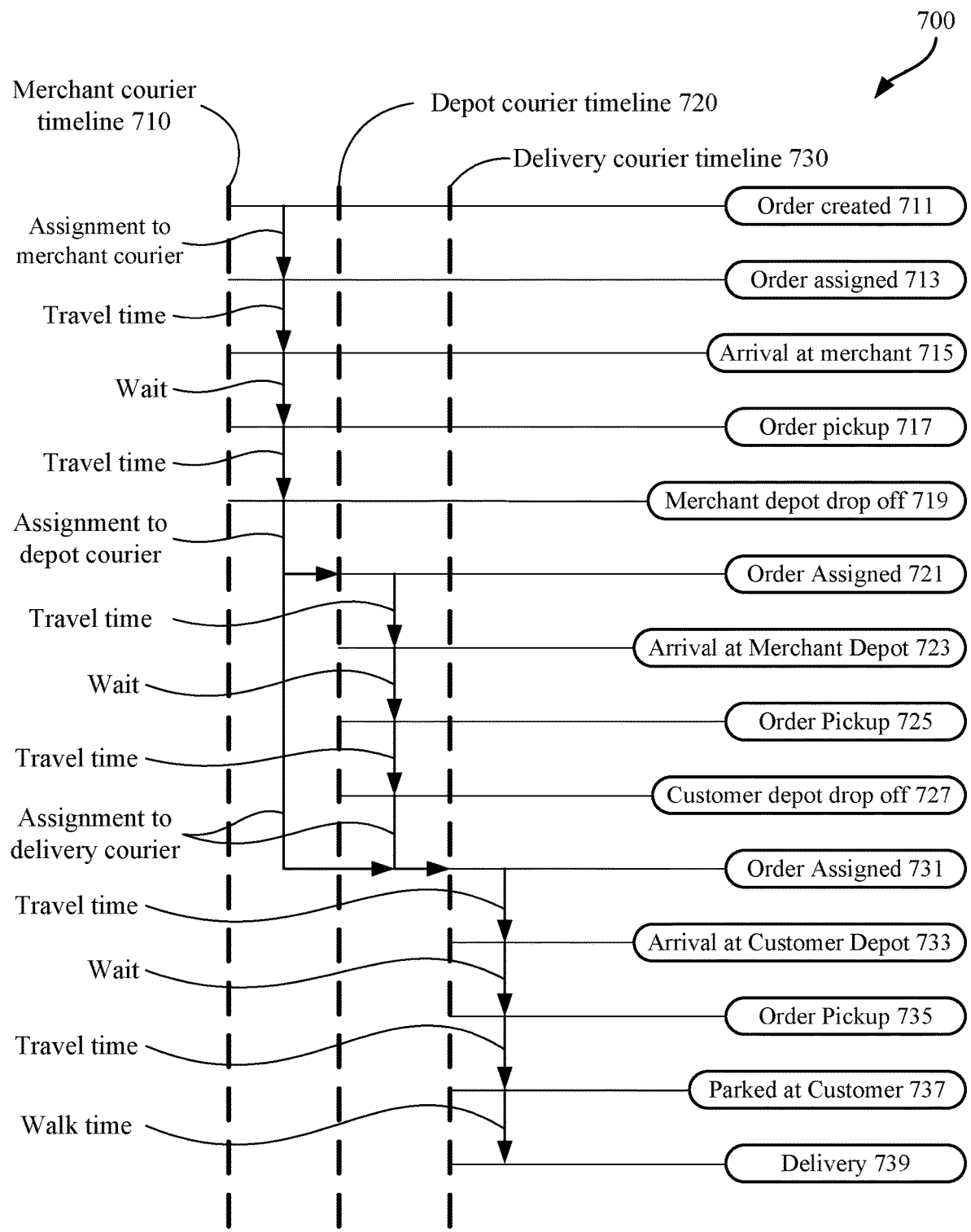
FIG. 7 illustrates another example timeline of delivery events associated with couriers operating within a depot dispatch protocol, in accordance with one or more embodiments.

With reference to FIG. 7, shown is another example timeline 700 of delivery events associated with couriers operating within a depot dispatch protocol, in accordance with one or more embodiments. In some embodiments, the depot dispatch protocol may be implemented through systems 600 and/or 650. Timeline 700 illustrates how, in some embodiments, the implementation of a depot dispatch system may streamline courier activity, and thereby improve delivery efficiency of a system. Timeline 700 may also illustrate how a depot dispatch system may allow for a more efficient automated last-mile delivery of perishable goods.

In various embodiments, timeline 700 depicts the various events that occur when an order is placed by a customer on a merchant courier timeline 710, a depot courier timeline 720, and a delivery courier timeline 730. Merchant courier timeline 710 may correspond to the actions taken by a merchant courier, such as 620-A, 620-B, or 620-C. Depot courier timeline 720 may correspond to actions taken by a depot courier, such as 622-A or 622-B. Delivery courier timeline 730 may correspond to actions taken by a delivery courier, such as 624-A, 624-B, or 624-C.

In some embodiments, timeline 700 may also run concurrently with merchant timeline 210 corresponding to a merchant such as merchant 610-A. In various embodiments, a merchant courier timeline, a depot courier timeline, and a delivery courier timeline may include additional or fewer events than depicted in FIG. 7. As previously described, the events in timeline 700 may be tracked via transmission between a server system, location beacons, and client devices associated with one or more couriers, merchants, and/or customers, which may be further described with reference to FIG. 9.

The events that occur on merchant courier timeline 710 may include order creation 711, order assignment 713, arrival at merchant 715, order pickup 717, and merchant depot drop off 719. The events that occur on depot courier timeline 720 may include order assignment 721, arrival at merchant depot 723, order pick up 725, and customer depot drop off 727. The events that occur on delivery courier timeline 730 may include order assignment 731, arrival at customer depot 733, order pick up 735, parked at customer 737, and order delivery 739.

An order creation event 711, like order creation 412-A, 412-B, or 212-A, may occur when the system receives an order message created by a customer, such as customer 630-A at a customer device corresponding to the customer. The order information may then be routed by the delivery routing system to the designated merchant, such as merchant 610-A, and placed, such as at event 214. The order may also be assigned to a designated merchant courier, such as merchant courier 620-A, corresponding to the particular merchant 610-A. An order assignment may be sent from a server to a client device corresponding to the merchant courier. In other embodiments, the order assignment may be sent to a dispatch device at the merchant depot, which may correspond to a dispatcher or other personnel stationed at the merchant depot. A merchant courier at the merchant depot may then select or be given the order assignment.

The order assigned event 713 may occur upon acknowledgement of the order assignment by merchant courier 620-A or the dispatcher via the corresponding client device. In some embodiments, the merchant courier or other personnel may acknowledge the order assignment by transmitting a confirmation to the system from the corresponding client device. The merchant courier may then travel to the location of the merchant while the order is confirmed at 216 and/or being prepared by the merchant.

In some embodiments, additional events corresponding to a courier's arrival to and departure from a particular location may be tracked using wireless devices, such as sensors or beacons. For example, the merchant courier's departure from and arrival at the merchant depot may also be tracked. In some embodiments, wireless sensors or beacons may be installed at the merchant depot to track the presence of the merchant courier by communicating with a client device of the merchant courier. For example, the merchant courier's client device may remain connected or in communication with the merchant courier's client device while the merchant courier is within a predetermined distance from the merchant depot. When the merchant courier travels beyond the predetermined distance, the connection may be broken causing a confirmation of the departure event to be transmitted to the delivery routing system via the sensor or the client device of the merchant courier. In various embodiments, tracking these additional events may provide improved accuracy of ETA predictions along the courier timelines described herein.

The arrival at merchant event 715 may occur when the merchant courier 620-A arrives at the location of merchant 610-A. In some embodiments, the merchant courier may transmit a confirmation of arrival via a client device. In some embodiments, the confirmation of arrival may be transmitted by the merchant via a corresponding client device. As previously described, the arrival of the merchant courier at the merchant location may alternatively, and/or additionally, be automatically tracked and confirmed using BLE-enabled beacons and devices. For example, the merchant courier's client device may transmit or receive a signal from a beacon located at the merchant site causing the confirmation of arrival merchant event 715 to be transmitted to the delivery routing system via the client device of the merchant or merchant courier.

In some embodiments, the merchant courier may have to wait for the order to be completed before order pickup event 717 if arrival at merchant 610-A occurs before order ready event 218. However, the predictive model may be implemented to determine an ETA for the order ready event 218 and a predicted travel time of the merchant courier in order to assign orders and route the merchant courier with departure and arrival times such that the arrival at merchant event 715 coincides with the order ready event 218. This may improve the efficiency of the actions of the merchant courier and the merchant by minimizing down time, which may occur where the merchant courier arrives before the merchant has completed the order, or where the merchant has completed the order before the merchant courier arrives.

In some embodiments, a merchant courier may be assigned to pick up multiple orders from a single merchant. In some embodiments, merchant couriers may be scheduled to arrive at a merchant location when multiple orders are estimated to be ready at 218. The merchant courier may then pick up all the assigned orders at order pickup event 717. The order pickup event 717 may occur when the merchant courier or the merchant transmits a confirmation to the delivery routing system. In some embodiments, merchant couriers may be assigned to pick up one or more additional orders from another merchant. Such orders may be grouped and assigned to merchant courier based on the proximity of the merchants and/or a generated route assigned to the merchant courier. Such grouping may be determined by the delivery routing system.

After order pickup event 717, merchant courier 610-A may then travel to merchant depot 612-A to drop off the one or more orders. An additional event corresponding to the merchant courier's departure from the merchant location may be manually tracked or automatically tracked using wireless beacons and devices. The return of the merchant courier to the merchant depot may also be manually or automatically tracked as described above.

Once the order is dropped off at the merchant depot, merchant courier 620-A may transmit a confirmation of merchant depot drop off event 719. In some embodiments, a dispatcher at merchant depot 610-A may transmit the confirmation of merchant depot drop off event 719. In some embodiments, merchant courier 610-A may deposit the one or more orders into lockers assigned by the delivery routing system. In some embodiments, an automated locker system may transmit the confirmation of merchant depot drop off event 719. For example, the automated locker system may transmit a confirmation when an assigned locker is accessed and closed by the merchant courier or other depot personnel.

Multiple orders from various merchants may be aggregated at merchant depot 610-A. In some embodiments, the orders may be grouped into batches based on delivery destination and expected time of merchant depot drop off event 719. In various embodiments, the orders may be automatically grouped by the delivery routing system or manually grouped by a dispatcher at the merchant depot. Each batch of orders may include one or more orders. In some embodiments, batched orders may be deposited in the same locker storage location by dispatcher or delivering merchant courier. Batches of orders grouped at the merchant depot may be referred to herein as "transfer batches."

Once the orders have been grouped into batches, one or more transfer batches may be assigned to a depot courier, such as depot courier 622-A at order assigned event 721. In some embodiments, the order assigned event 721 may occur upon acknowledgement of the order assignment by the delivery courier or other personnel via a corresponding client device. In some embodiments, the delivery courier is stationed at the merchant depot. In some embodiments, the delivery courier may travel to merchant depot.

Upon arrival of the depot courier, the depot courier or merchant depot personnel may transmit a confirmation of arrival to trigger arrival at merchant depot event 723. Alternatively, and/or additionally, the arrival and departure of depot courier 622-A may be automatically tracked and confirmed using wireless beacons and devices as described. Upon arrival at the merchant depot, the depot courier may take possession of the assigned orders at order pickup event 725. In some embodiments, the depot courier may retrieve the assigned order or batches from lockers or other personnel. In some embodiments, such personnel may be available to hand off orders such that couriers do not need to park or leave their vehicles at depot. In some embodiments, the depot courier may directly retrieve the orders or batches from automated lockers. In various embodiments, order pickup event 725 may correspond to a confirmation transmitted to the delivery routing system by an automated locker system, the depot courier, or other personnel.

In some embodiments, one or more orders may be assigned to depot couriers before the orders are grouped into batches. As more orders are dropped off by merchant couriers, the additional orders may then be assigned to couriers as additional deliveries. This may improve the efficiency of courier activity to minimize downtime. For example, by assigning an order to a depot courier before grouping, the depot courier may be directed to head toward the merchant depot as the merchant courier is traveling toward the merchant depot such that arrival at merchant depot event 723 occurs concurrently with or close to merchant depot drop off event 719 to minimize the wait time between arrival at merchant depot 723 and order pickup event 725.

After order pickup event 725, the depot courier then travels to the customer depot to transport the assigned orders to a customer depot, such as customer depot 614. In some embodiments, an event corresponding to the arrival of the depot courier at the customer depot may be tracked manually or automatically as described.

At the customer depot, the depot courier may drop off the orders to trigger customer depot drop off event 727. Once the order is dropped off at the merchant depot, confirmation of customer depot drop off 727 may be transmitted by the depot courier or other customer depot personnel. In some embodiments, the depot courier may deposit the one or more orders into assigned lockers at the customer depot. In some embodiments, an automated locker system may transmit the confirmation of customer depot drop off event 727. For example, the automated locker system may transmit a confirmation when an assigned locker is accessed and closed by the courier or other depot personnel. Like merchant couriers, there is no need for depot couriers to park or spend time finding parking at the merchant depots or customer depots. Thus depot couriers can conveniently and efficiently transport orders between the depots.

The orders may be further grouped into batches at the customer depot based on delivery destination. As described herein, batches of orders grouped at the customer depot may be referred to as "delivery batches." In various embodiments, the orders may be automatically grouped by the delivery routing system or manually grouped by personnel at the customer depot. Each batch of orders may include one or more orders.

For example, orders originating from different merchant depots, such as merchant depots 612-A and 612-B, may arrive at customer hub 614. Delivery batches of orders may be grouped together from orders from the different merchant depots based on delivery destination or delivery courier route. The order from merchant hub 612-A and the order from merchant hub 612-B may be grouped because they are to be delivered to customers in the same apartment complex or college dorm building. As another example, orders from merchant hubs 612-A and 612-B may be further organized into a delivery batch because the delivery destinations are located along a predetermined route of an assigned delivery courier.

This may allow grouping of orders from different merchants place by the same customer. Thus, orders originating from different locations with the same delivery destination may be grouped at some point along the last-mile delivery route by couriers delivering other orders. This results in a more efficient use of couriers since the grouping of the multiple orders occurs along routes being used to transport other deliveries. This may also potentially allow multiple orders to be delivered to the particular customer simultaneously. Multiple orders placed by the same customer may also be grouped so that one delivery courier may deliver all orders to the customer at once. For example, one order placed by a customer may be held at a customer depot until another order placed by that same customer arrives at the customer depot before assigning both orders to a delivery courier.

Once the orders have been grouped into delivery batches at the customer depot, a delivery batch of orders may be assigned to a delivery courier, such as delivery courier 624-B at order assigned event 731. In some embodiments, the order assigned event 731 may occur upon acknowledgement of the order assignment by the delivery courier or other personnel via a corresponding client device. In some embodiments, the delivery courier is stationed at the customer depot. In some embodiments, the delivery courier may travel to the customer depot to pick up assigned orders.

Upon arrival of the delivery courier, the delivery courier or customer depot personnel may transmit a confirmation of arrival to trigger arrival at customer depot event 733. Alternatively, and/or additionally, the arrival of the delivery courier may be automatically tracked and confirmed using wireless devices as described. After arrival at the customer depot, the delivery courier may take possession of the assigned orders at order pickup event 735. In some embodiments, the delivery courier may retrieve the assigned order or batches from lockers or other personnel. In some embodiments, such personnel may be available to hand off orders such that delivery couriers do not need to park or leave their vehicles at depot. In some embodiments, the depot courier may directly retrieve assigned orders from automated lockers. In various embodiments, order pickup event 735 may correspond to a confirmation transmitted to the delivery routing system by the locker system, the delivery courier, or other personnel.

In some embodiments, one or more orders may be assigned to delivery couriers before the orders are grouped into delivery batches. As more orders are dropped off at the customer depot by depot couriers, the additional orders may then be assigned to a delivery couriers as additional deliveries. This may improve the efficiency of delivery courier activity by minimizing downtime. For example, by assigning an order to a customer depot before grouping, the delivery courier may be directed to head toward the customer depot as the depot courier is traveling toward the customer depot such that arrival at customer depot event 733 occurs concurrently with or close to customer depot drop off event 727 to minimize the wait time between arrival at customer depot event 733 and order pickup event 735.

After order pickup event 735, delivery courier 624-B may then travel toward the location of one or more customers, including customer 630-A to complete delivery of the order at order delivery event 739. Order delivery event 739 may occur when the order has been given to the customer. Order delivery event 739 may be triggered by confirmation of the delivery by the customer or the delivery courier via corresponding devices. In some embodiments, one or more delivery couriers may be already stationed at the customer depot on standby. This may allow immediate pick up by a delivery courier once an order or batch of orders is assigned to a delivery courier.

Additional events may be tracked between the order pickup event 735 and the order delivery event 739. For example, the delivery courier may confirm parking the vehicle near the customer location. This may be done via confirmation transmitted from the delivery courier's client device to the server. In some embodiments, confirmation is automatically detected via wireless beacons and devices as described.

In some embodiments, orders at the merchant depot may be assigned to a delivery courier to pick up and deliver directly to a customer, as previously described with reference to FIGS. 3, 4, and 5A. Thus, in particular instances, order assignment event 731 may occur immediately after merchant depot drop off 719, to assign a batch of orders to a delivery courier at the merchant depot. For example, where customers are located closer to the merchant depot, it may be more time efficient for a delivery courier to deliver the corresponding order from the merchant depot. For example, delivery courier 624-A is depicted as delivering an order from merchant depot 612-A to customer 630-A.

Systems implementing merchant hubs and customer hubs can greatly improve efficiency of courier activities, delivery times, and ETA predictions. Not only can merchant couriers travel to merchant locations more quickly, the described systems provide a delivery handoff system that does not require delivery couriers or depot couriers to spend time looking for parking or even to park at all. Furthermore, couriers may quickly pass through depots to pick up or drop off orders, thereby minimizing down time from waiting for orders to be completed or handed off.

The depots also provide a location to station one or more couriers allowing for instant assignment and transfer of orders between couriers. Such "instant pickup" of orders would reduce down time from couriers traveling to a depot to pick up orders or from transferring orders between personnel or other storage locations.

The division of the last-mile delivery routes into segments further improves efficiency. Because each segment is shorter than the total route, couriers travel shorter distances between each designated destinations and are thus able to make more trips and transport more orders within a given amount of time. Shorter routes between constant destination points, such as between depots, also provide more efficient determination of optimal travel routes for couriers. The division of last-mile delivery activities also creates a division of labor in the system so that personnel and couriers may specialize on particular tasks. For example, a courier may gain specialized knowledge in traveling a particular route or customer locations in a neighborhood.

Overall, the orders in the system are delivered more quickly by transporting the orders between depots. Rather than having a courier deliver from a merchant location or a merchant depot to several customer locations, depot couriers may transport a greater number of orders in a shorter amount of time. Then by having orders aggregated at a customer depot that is located near the delivery locations for such orders, delivery couriers may complete deliveries over shorter distances allowing them to complete more deliveries in a shorter amount of time.

Automation of one or more functions along the last-mile delivery route further enhances reliability, predictability, and efficiency of the system by reducing deviations from human error and behavior. Moreover, tracking of events is improved, including enablement of continuous event tracking. For example, an AV courier eliminates the need for a human courier to confirm their return to the vehicle after an order pick up. As another example, automated systems, such as an AV courier, may be configured to automatically transmit confirmations of various events, such as when an order is received. Thus the system is less reliant on human participants to confirm particular events, which can be unreliable due to human error. As such, ETAs of various events are more predictable.

In addition, customers may be given an option to pick up orders directly at the customer depot. Thus, some customers may not have to wait. For certain customers, this may provide the customer a sense of active participation such as for those who prefer not to wait.

Figure 8:
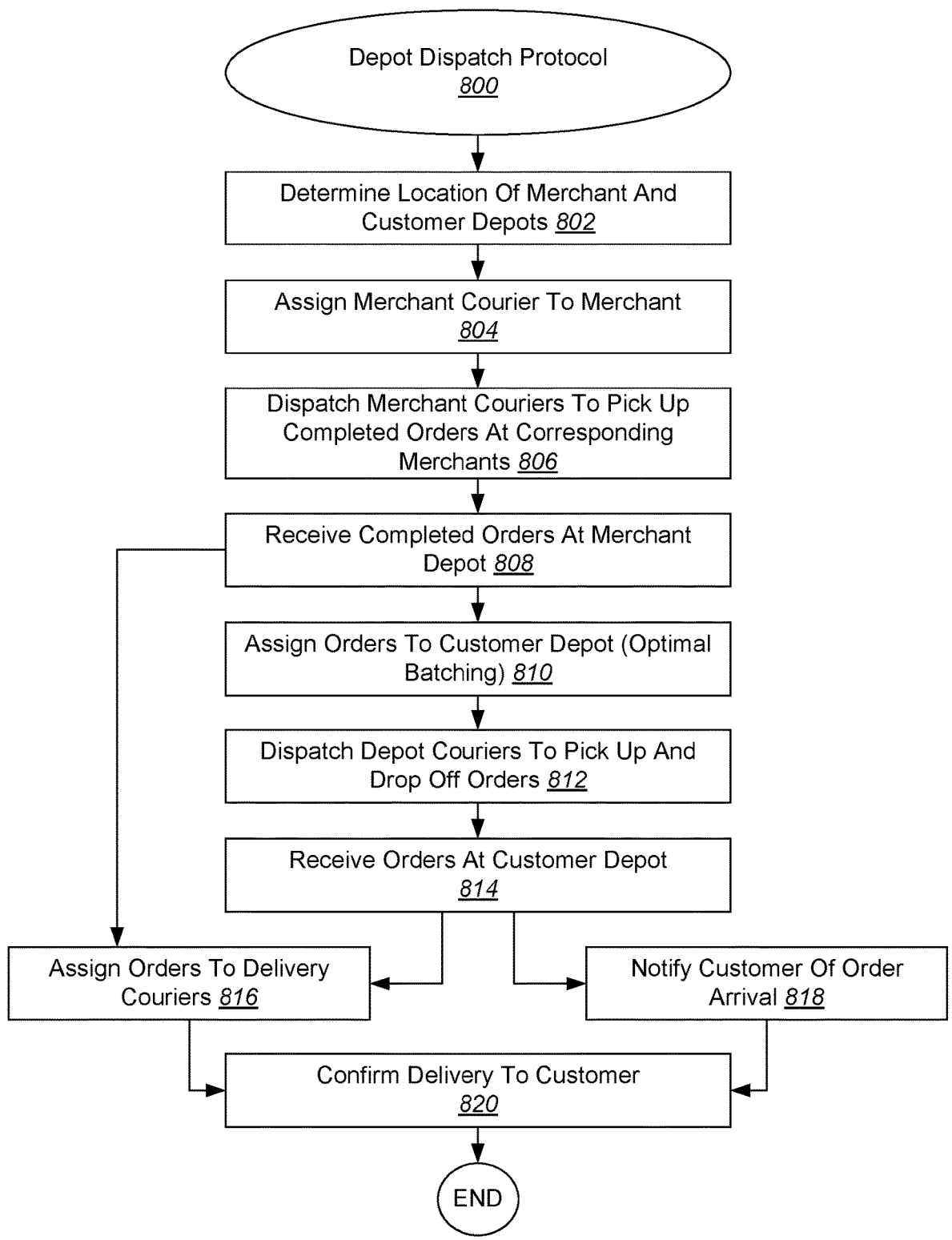
FIG. 8 illustrates an example depot dispatch protocol for routing couriers in a logistics platform system, in accordance with one or more embodiments.

With reference to FIG. 8, shown is an example depot dispatch protocol 800 for routing couriers in a logistics platform system, in accordance with one or more embodiments. In various embodiments, depot dispatch protocol 650 may be implemented for optimizing on-demand deliveries of perishable goods.

At 802, the locations of merchant and customer depots, such as merchant depots 612-A and 612-B and customer depot 614, are determined. The optimal location for such aggregation depots may be based on factors such as traffic congestion, foot traffic, relative location to merchants and customers, ease of accessibility for couriers, delivery density, etc. For example, one or more considerations previously described, or from process 550, may be used to determine appropriate locations for customer depots.

At 804, merchant couriers are assigned to merchants such that each merchant has at least one designated merchant courier. In some embodiments, a merchant courier may be assigned to multiple merchants. In particular embodiments, merchant couriers may be stationed at the merchant depot and a merchant courier may be assigned to the merchant upon assignment of the order to the merchant courier, such as at event 713. Once orders are placed by customers or confirmed by the merchant, one or more merchant couriers are dispatched to pick up completed orders at their assigned merchants at 806. A merchant courier may be scheduled to arrive at a merchant location at or near the ETA for order completion of a particular order (such as event 218). In some embodiments, one or more merchant couriers may be assigned to pick up completed orders at more than one merchant location.

At 808, completed orders are dropped off and received at the merchant depot. The drop off of an order at the merchant depot may be confirmed by the merchant courier or other personnel, or by an automated order retrieval system, such as automated locker storage units. The merchant courier may then return to the assigned merchant locations to pick up additional orders to transport to the merchant depot (repeating steps 804, 806, and 808).

As such, orders may be aggregated, and grouped at the merchant depot for further assignment to subsequent couriers. At 810, batches of orders are assigned to a particular customer depot, such as customer depot 614. The orders may be grouped into transfer batches, in part, on delivery destination, such that the customers corresponding to orders in the batch are located within a predetermined distance from the assigned customer depot.

At 812, depot couriers are then dispatched to pick up orders to drop off at the assigned customer depots. In various embodiments, a transfer batch of one or more orders is assigned to a depot courier. In some embodiments, depot couriers are stationed at a merchant depot or customer depot. As previously described, depot couriers may travel along predetermined routes between merchant depots and customer depots. In some embodiments, a depot courier may be routed to a particular merchant depot once a batch of one or more orders is assigned to the merchant courier.

At 814, orders are received at customer depots. The drop off of an order at the customer depot may be confirmed by the depot courier or other personnel, or by an automated order retrieval system, such as automated locker storage units. The depot courier may then return to the merchant depot to pick up additional orders to transport to the customer depot (repeating steps 810, 812, and 814). As such orders may be further aggregated, batched, and organized at the merchant depot for assignment to subsequent couriers.

At 816, orders are assigned to delivery couriers. A batch of one or more orders may be assigned to a delivery courier based, in part, on delivery destinations. The delivery courier may then travel to the customer depot to pick up the assigned orders. In some embodiments, delivery couriers may be stationed at the customer depot. In some instances, orders may be assigned to delivery couriers at 816 at the merchant depot after step 808. In such embodiments, a delivery courier would pick up the order directly from the merchant depot, as previously described with reference to FIGS. 3, 4, and 5A. In particular embodiments, delivery couriers may also be stationed at merchant depots.

Once an order or group of orders is assigned to a delivery courier, that delivery courier will travel to the depot to pick up the order. The delivery courier may be authenticated and the pickup of the order is confirmed. In some embodiments, one or personnel may be present to hand off assigned orders to the delivery couriers such that couriers need not park their vehicles. In other embodiments, delivery couriers may be directed to the locker location storing their assigned orders and authenticate with the automated storage system to retrieve the assigned orders. Once the assigned orders are collected by the courier, the courier travels toward the customer location to complete the delivery. Delivery of the order to the customer may be confirmed at 820.

In some embodiments, customers may pick up their orders directly from the customer depot. At 818, a customer receives a notification of the arrival of their order at the customer depot. The notification message may be transmitted to the customer device. The notification message may also include the location of the order, such as the designated locker location of an automated locker system. The customer may then travel to the customer depot to pick up their order. In some embodiments, the customer may be authenticated by personnel or wireless communication between devices to access their order. For example, the customer may input or transmit a unique access code, such as transmitting a message or scanning a barcode to access the designated locker location. Once the order is transferred to the customer, the delivery of the order may then be confirmed at 820 by the customer, depot personnel, or the automated system. For example, once the designated locker location is accessed by the customer's unique code, the system may confirm delivery to the customer.

Figure 9:
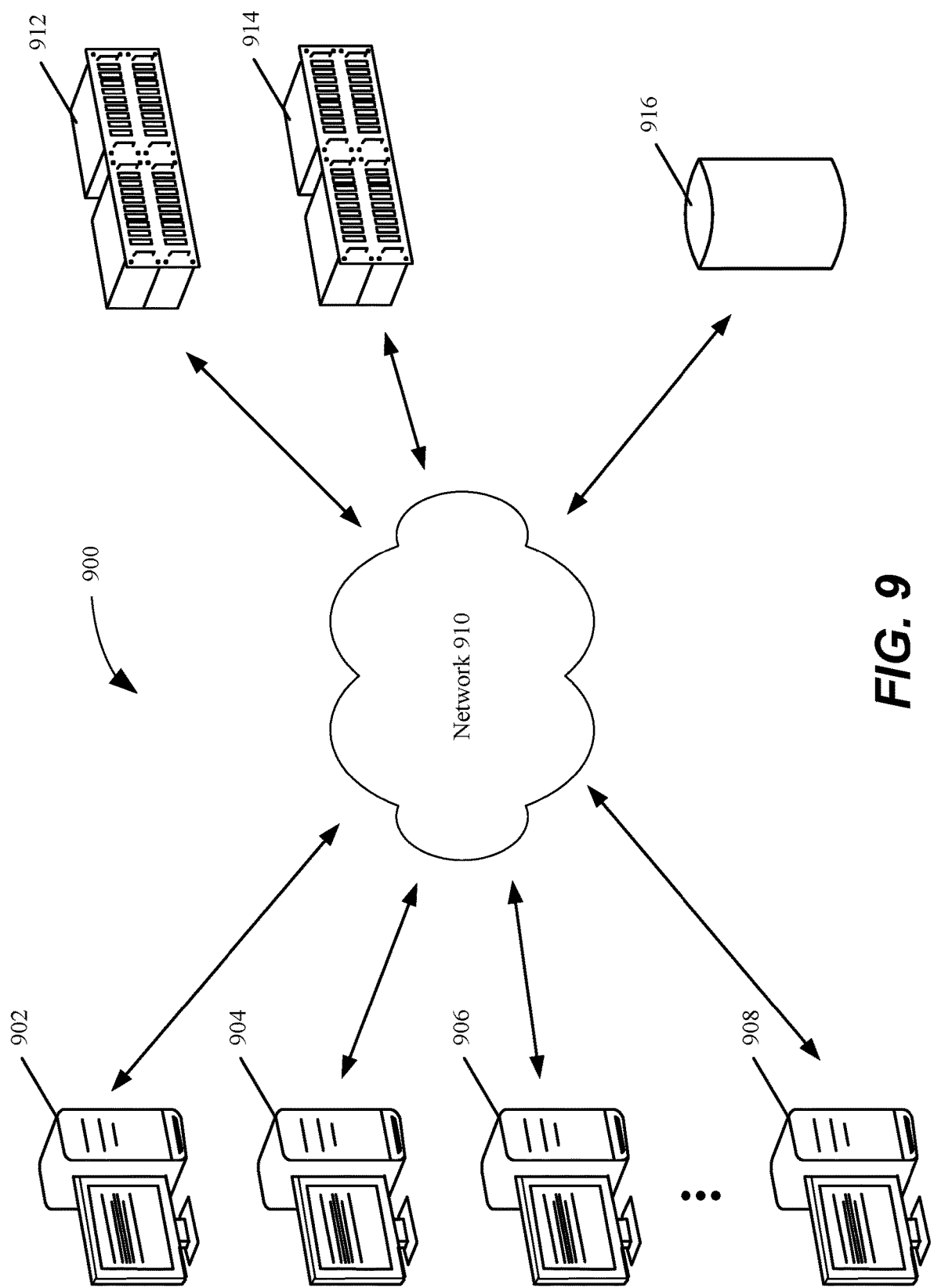
FIG. 9 illustrates a diagram of an example network architecture for implementing various systems and methods of the present disclosure, in accordance with one or more embodiments.

In various embodiments, one or more of the events described herein may be transmitted to a client devices corresponding to customers, merchants, or couriers. FIG. 9 illustrates a diagram of an example network architecture 900 for implementing various systems and methods of the present disclosure, in accordance with one or more embodiments. The network architecture 900 includes a number of client devices 902-908 communicably connected to one or more server systems 912 and 914 by a network 910.

In some embodiments, server systems 912 and 914 include one or more processors and memory. The processors of server systems 912 and 914 execute computer instructions (e.g., network computer program code) stored in the memory to perform functions of a network data exchange server. In various embodiments, the functions of the network data exchange server may include routing real-time on-demand delivery of perishable goods, transmitting notifications or instructions to client devices, and/or predicting and dynamically updating estimated time of arrivals (ETAs) for such deliveries.

In some embodiments, server system 912 is a content server configured to receive and store network profile information. In some embodiments server system 914 is a dispatch server configured to transmit and/or route network data packets including network messages. In some embodiments, content server 912 and dispatch server 914 are configured as a single server system that is configured to perform the operations of both servers.

In some embodiments, the network architecture 900 may further include a database 916 communicably connected to client devices 902-908 and server systems 912 and 914 via network 910. In some embodiments, network data, or other information such as user information, courier information, and merchant information, may be stored in and/or retrieved from database 916.

Users of the client devices 902-908 access the server system 912 to participate in a network data exchange service. For example, the client devices 902-908 can execute web browser applications that can be used to access the network data exchange service. In another example, the client devices 902-908 can execute software applications that are specific to the network (e.g., networking data exchange "apps" running on smartphones).

Users interacting with the client devices 902-908 can participate in the network data exchange service provided by the server system 912 by distributing digital content, such as text comments (e.g., updates, announcements, replies), digital photos, videos, online orders, payment information, activity updates, location information, or other appropriate electronic information. In some implementations, information can be posted on a user's behalf by systems and/or services external to the network or the server system 912. For example, the user may post a review of a restaurant to a restaurant review website, and with proper permissions that website may cross-post the review to the network on the user's behalf. In another example, a software application executed on a mobile device, with proper permissions, may use global positioning system (GPS) capabilities to determine the user's location and automatically update the network with his location (e.g., "At Home", "At Work", "In San Francisco, Calif.").

In some implementations, the client devices 902-908 can be computing devices such as laptop or desktop computers, smartphones, personal digital assistants, portable media players, tablet computers, or other appropriate computing devices that can be used to communicate with an electronic social network. In some implementations, the server system 912 can include one or more computing devices such as a computer server. In various embodiments, each of client devices 902-908 may be any one of merchant devices corresponding to merchants 110-116, courier devices corresponding to couriers 120-128, or customer devices corresponding to customers 130-136.

In some implementations, the server system 912 can represent more than one computing device working together to perform the actions of a server computer (e.g., cloud computing). In some implementations, the network 910 can be a public communication network (e.g., the Internet, cellular data network, dial up modems over a telephone network) or a private communications network (e.g., private LAN, leased lines).

Figure 10A:
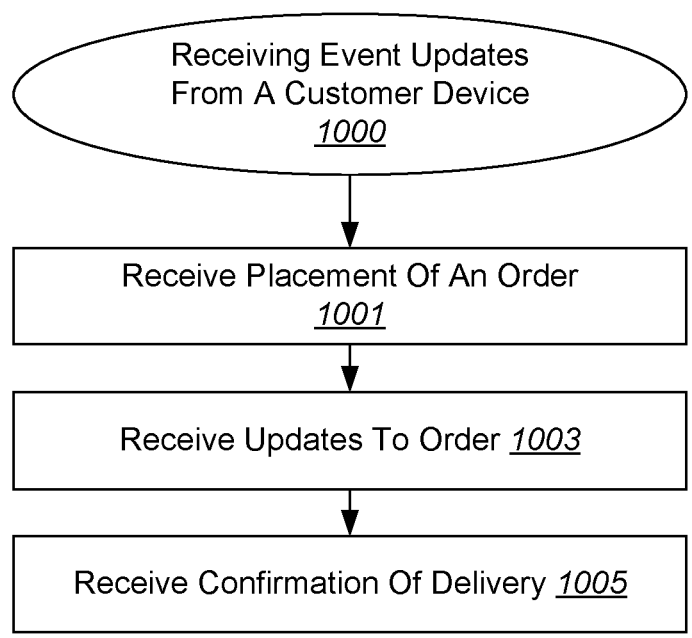
FIGS. 10A, 10B, and 10C illustrate example processes for processing of various events and time stamps using weight factors, in accordance with one or more embodiments.
Figure 10B:
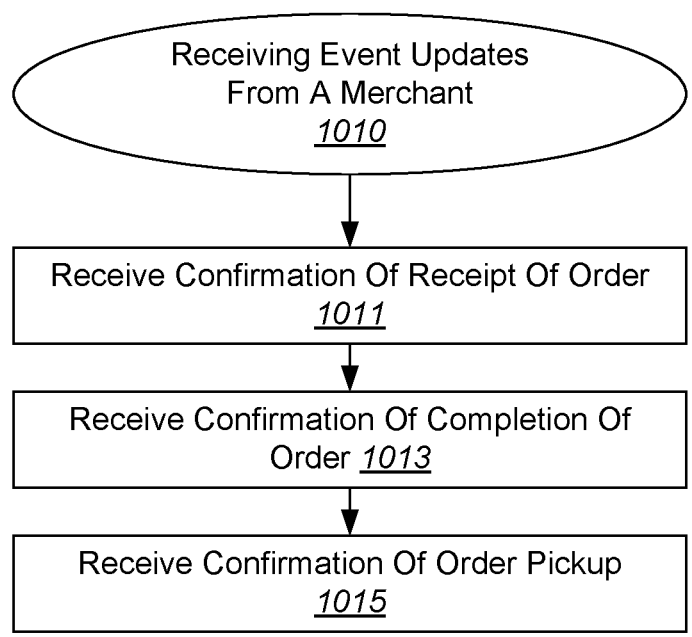
Figure 10C:
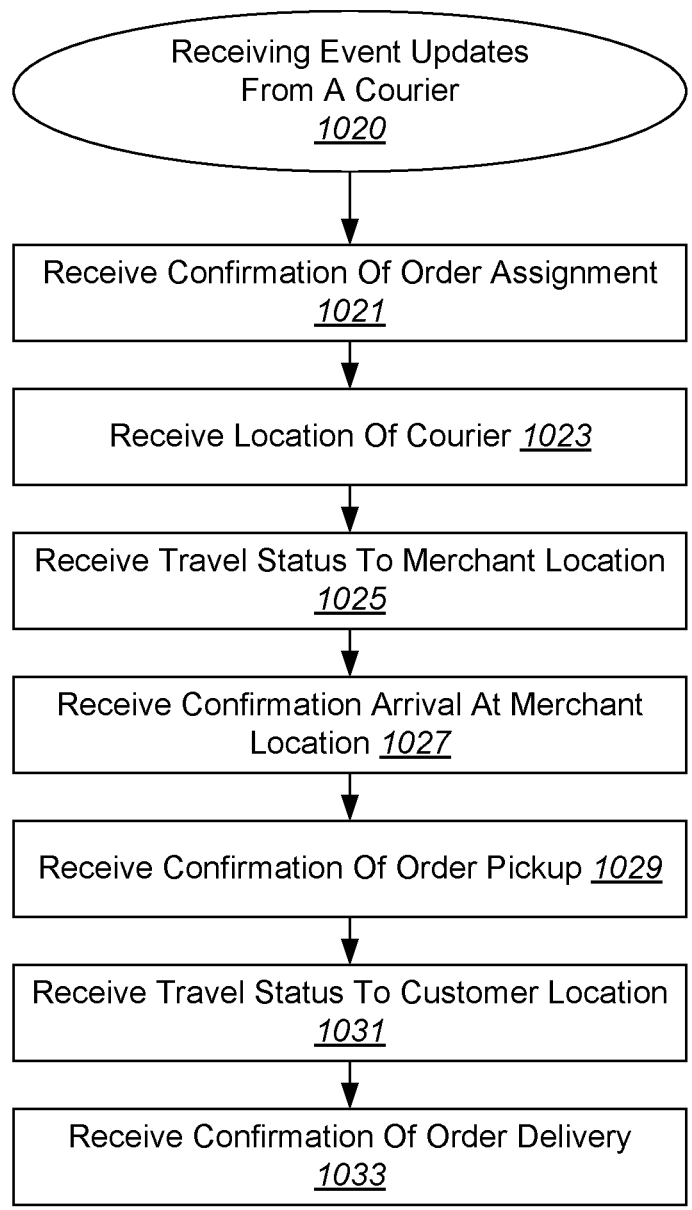

Various customers, merchants, and couriers may transmit information related to one or more orders to the servers 912 or 914 via corresponding client devices. As previously described, such information may include order information, payment information, activity updates, timestamps, location information, or other appropriate electronic information. The system may then utilize this information to calculate the ETA of the delivery of the order, as well as dynamically updating the ETA when updated timestamps are received. With reference to FIGS. 10A-10C, shown are example methods for receiving multiple events and timestamps, in accordance with one or more embodiments.

FIG. 10A depicts an example flow chart of an example process 1000 for receiving event updates from a customer device. At 1001, a placement of an order is received. In some embodiments, an order may be placed by a customer on a corresponding customer device, such as 902-908. In some embodiments, the order may be places in a web browser or an application installed in the customer device. The order information may be transmitted via network 910. The order placement may include location information corresponding to the location for delivery of the order. For example, the location of the customer device may be determined via GPS. As another example, the location information may include an address corresponding to the customer. Order placement may further include additional information, such as ordered items, payment information, and other customer information. In some embodiments, the receipt of an order at 1001 may correspond to the order creation event 212-A and/or 212-B.

In some embodiments, updates to the order may be received at 1003. In some embodiments, order updates may include addition or removal of various items in the order, cancellation of the order, changes in delivery location, etc. In some embodiments, updates to the order may be factored into the predicted ETA of order delivery. In some embodiments, a confirmation of delivery may be received from the customer device at 1005. For example, the customer may transmit a confirmation of delivery via the customer device once the order is received from the courier. However, in some embodiments, confirmation of delivery may be transmitted by the courier via a corresponding courier device, as further described with reference to FIG. 10C. In some embodiments, receiving updates to the order may be an optional implementation.

FIG. 10B depicts an example flow chart of an example process 1010 for receiving event updates from a merchant device. A confirmation of receipt of order may be received at 1011. In some embodiments, an order may be routed over network 910 by the system to the merchant device associated with the appropriate merchant. The merchant may then transmit a confirmation of receipt of the order, which may trigger the order confirmation event 216. In some embodiments, the confirmation of receipt order at 1011 may be automatically transmitted via network 910 to the system 912 once the order has been successfully routed to and received by the merchant device.

Once the merchant has completed the preparation of the order, a confirmation of completion of order may be received at 1013. The confirmation of completion of order may trigger the order ready event 218. A confirmation of order pickup may then be received at 1015 and trigger the order pickup event 220-A. The merchant may transmit the order pickup confirmation via the merchant device once the courier has picked up the order. However, in some embodiments, confirmation of order pickup may be transmitted by the courier via a corresponding courier device, as further described with reference to FIG. 10C.

FIG. 10C depicts an example flow chart of an example process 1020 for receiving event updates from a courier device. Such courier device may correspond to any one of merchant couriers, depot couriers, or delivery couriers, as previously described. At 1021, a confirmation of order assignment may be received. In some embodiments, the confirmation of order assignment may be an acceptance of the order assignment input by the courier on the courier device. At 1023, the location of the courier may be received. In some embodiments, the location of the courier may be tracked and updated in real time. In some embodiments, the location of the courier may be tracked via the courier device, such as by using real-time GPS coordinates. In some embodiments, the location of the courier may be additionally tracked using proximity beacons.

In various embodiments, the courier may travel to the merchant location after order assignment 222. As the courier travels to the merchant location, the travel status to the merchant location may be received at 1025. In various embodiments, the travel status may include the status of the vehicle corresponding to the courier. For example, the courier device may transmit a notification to the server system that the courier has parked his vehicle near the merchant location. This may correspond to the parked at merchant event 224.

Upon the courier's arrival at the merchant location, a confirmation of arrival at merchant location may be received at 1027. In some embodiments, the confirmation of arrival at merchant location may be a check-in status update input by the courier on the courier device and transmitted via network 910. Once the order is provided to the courier, a confirmation of order pickup may be received at 1029. In some embodiments, the confirmation of order pickup may be confirmed by the courier via the courier device. As previously described, the confirmation of order pickup may additionally, and/or alternatively, be confirmed by the merchant via the merchant device.

In various embodiments, the courier may travel to the customer location after order pickup 220-B. As the courier travels to the customer location, the travel status to the customer location may be received at 431. In various embodiments, the travel status may include the status of the vehicle corresponding to the courier. For example, the courier device may transmit a notification to the server system that the courier has returned to the vehicle after the order pickup. This may correspond to the return to vehicle event 228. As another example, the courier device may transmit a notification to the server system that the courier has parked his vehicle near the customer location. This may correspond to the parked at customer event 230.

Next, a confirmation of order delivery may be received at 1033 from the courier device. In some embodiments, the confirmation of order delivery may be confirmed by the courier via the courier device. As previously described, the confirmation of order delivery may additionally, and/or alternatively, be confirmed by the customer via the customer device.

Although process 1020 is described with regards to merchant locations and customer locations as courier destinations, it should be recognized that courier destinations may also include merchant depots and/or customer depots at any one of process steps 1021 through 1033. For example, process 1020 may be implemented for a depot courier. As such, the travel status of the depot courier during travel to a merchant depot may be received at 1025, and confirmation of the depot courier's arrival at the merchant depot may be received at 1027. In this same example, the travel status of the depot courier may then be received at 1031 as the depot courier travels to a customer depot.

In some embodiments, additional event updates may be received from a devices corresponding to merchants, customers, or couriers. For example, confirmation of order pick up at the merchant location may be tracked. In some embodiments, processes 1000, 1010, and 1020 may be integrated within a single process. In some embodiments, the described system may receive additional or fewer event updates than depicted in FIGS. 10A-10C.

As described, in some embodiments, the travel status of the courier at various points in timelines 200, 400, and 700 may be tracked via a proximity system, which includes one or more beacons. Such systems and processes for determining the location of a courier using proximity sensors and/or beacons are described in U.S. patent application Ser. No. 15/826,737 titled IMPROVING PREDICITONS BY USING BEACONS IN A REAL-TIME LAST MILE LOGISTICS PLATFORM previously referenced above. Although U.S. patent application Ser. No. 15/826,737 describes systems and processes implementing BLE signals, it should be understood that such systems and processes may implement other wireless transmission signals and technologies including but not limited to, Wi-Fi, passive and active radio frequency identification (RFID) signals, cellular data, mobile-satellite communications, as well as low-power wide-area networks (LPWAN).

For example, beacon sensors may may be configured to detect a beacon device corresponding to the courier location. In some embodiments, the beacon device may be a client device associated with the courier. Such beacon sensors may be located at one or more merchant locations, at aggregation depots, or in courier vehicles. In some embodiments, the courier device may include the beacon sensor and beacon devices may be located at the courier's vehicle or various merchant locations. As the courier, and the corresponding courier device, travels toward and away from various beacons, the location real-time location of the courier may be tracked.

For example, if it is detected that the distance between the courier and the courier's vehicle increases after order assignment 222, but before order pickup 220-B, then it may be determined that the courier has parked the vehicle and is moving toward the merchant location. As another example, the courier may be determined to be walking toward the merchant location via proximity sensors located at one or more nearby merchant locations, as well as the target merchant location, which are configured to detect the beacon device corresponding to the courier's location. Arrival at merchant 226 may also be determined when the courier device is brought within a predetermined radius of a beacon sensor at the merchant location.

The travel status of the courier may also be tracked after order pickup 220-B and before order delivery 232. If it is detected that the distance between the courier and the merchant location increases, then it may be determined that the courier is leaving the merchant location and traveling toward the vehicle. As another example, once the courier moves within a predetermined radius of the vehicle, the proximity sensors may determine that the return to vehicle event 228 has occurred, and an additional travel status to customer location may be received at 831. Subsequently, if it is detected that the distance between the courier and the courier's vehicle increases, then it may be determined that the courier has parked the vehicle and is moving toward the customer location to deliver the order.

Additionally, after order delivery 232 occurs, the proximity system may determine that the courier has returned to the vehicle when the courier has traveled within a predetermined radius of the vehicle. This may indicate that the courier is ready to be given another order assignment. In various embodiments, other events indicating travel status of the courier to the merchant may be tracked at 1025 and 831.

Figure 11:
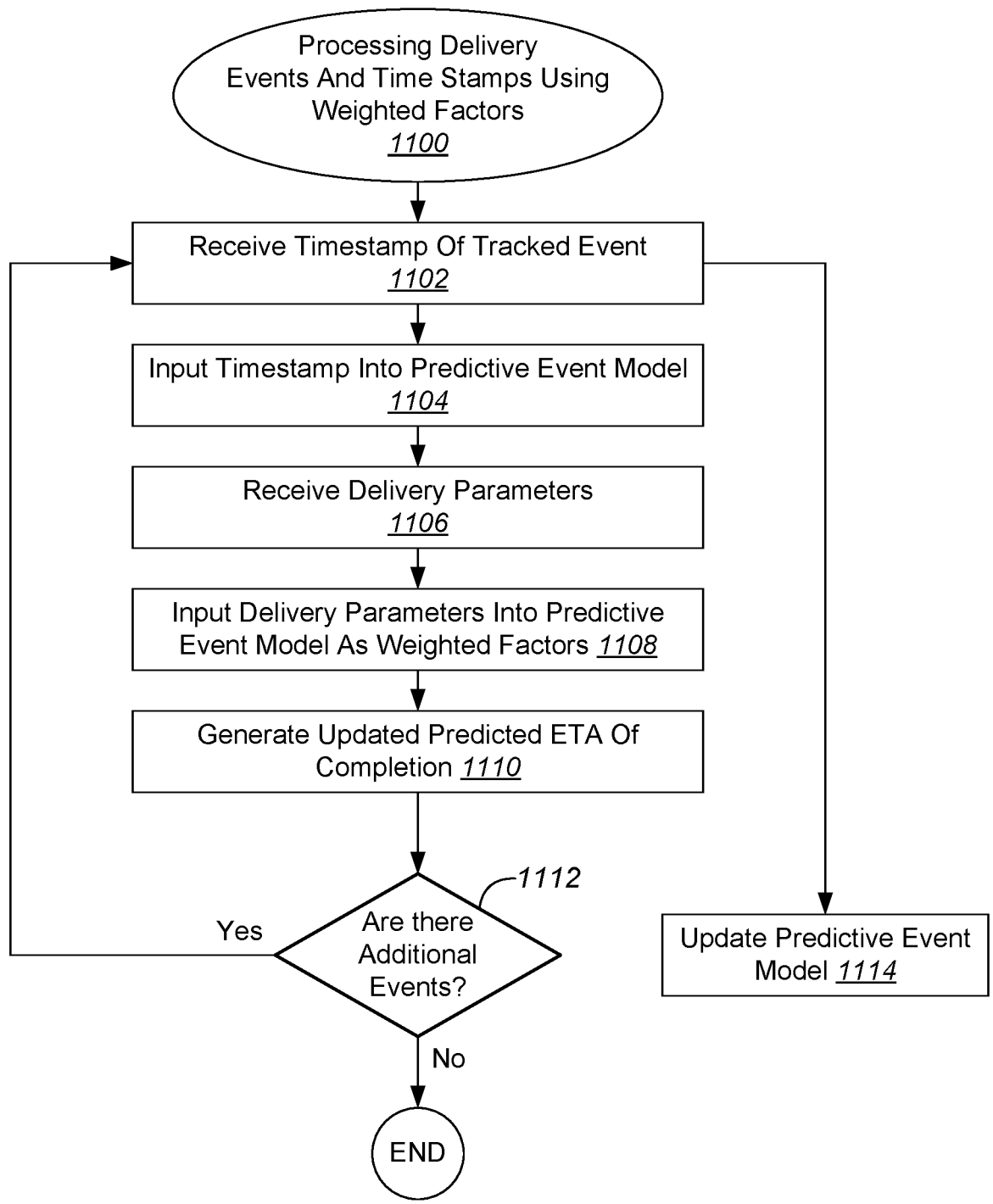
FIG. 11 illustrates a method for dynamic estimated time of arrival predictions, in accordance with one or more embodiments.

FIG. 11 illustrates and example process 1100 for processing of delivery events and time stamps using weighted factors, in accordance with one or more embodiments. At 1102, a timestamp of an event corresponding to an order is received. In various embodiments, the order may be an order placed by a customer via a customer device. In some embodiments, the event may be any one of events described with reference to FIGS. 2, 4, and 7, and received as described with reference to FIGS. 10A-10C.

At 1104, the timestamp is input into a corresponding predictive event model. In some embodiments, a neural network is implemented to generate an estimated time of arrival (ETA) for a particular order. Such systems may learn (or progressively improve performance) to do tasks by considering examples, generally without task-specific programming, such as generate accurate ETA predictions. In some embodiments, the neural network provides a predictive model to input a timestamp associated with an event and generate predictive ETAs for one or more subsequent delivery events.

In some embodiments, the neural network may comprise a plurality of subnetworks, each of which function as a predictive event model to generate an estimated length of time for a particular interval of time between subsequent delivery events. As used herein, the terms "subnetwork" and "event model" may be used interchangeably, unless otherwise noted. In some embodiments, each interval between events, such as those events illustrated in FIGS. 2, 4, and 7, may be associated with a subnetwork. In other words, a particular predictive event model may predict the duration between one event to the next, as shown in FIGS. 2, 4, and 7.

At 1106, delivery parameters corresponding to the order are received. Delivery parameters may include various factors or measurements that may affect the length of time between one or more tracked events. In various embodiments, delivery parameters may include time, date, traffic, weather, historical courier performance, and size of markets. Delivery parameters may further include the number of orders received, the number of items in an order, the type of dishes in an order, the sub-total of an order, the historical restaurant data. In various embodiments, various other parameters may be implemented in the neural network.

At 1108, the delivery parameters are input into the corresponding predictive event model as weighted factors. In various embodiments, the neural network may be trained to correlate the various parameters with particular effects on time durations between successive events. The neural network may assign weights to such parameters creating weighted factors. Such weights may be adjusted based on actual time of arrivals.

For example, certain dates may fall on holidays that are historically known to be busy days. Thus, certain holidays may be correlated with increased traffic or increased number of orders placed. Additionally, certain times of the day may be associated with heavier traffic, such as during rush hours. In some embodiments, the time of day is a parameter that is continuously updated in real-time and input into the neural network.

In some embodiments, traffic information may be tracked in real-time. In some embodiments, traffic information may be tracked by a third party application. In some embodiments, traffic data is updated in real-time, or constantly updated in near real-time.

Parameters corresponding to weather may also inform traffic or order impact. For example, inclement weather may correlate with heavier traffic due to hazardous conditions. Inclement weather may also correlate with more orders placed since customers may be more likely to stay indoors. Weather parameters may also correspond to change in demands for particular food types. For example, more ice cream may be ordered during hot days.

In some embodiments, the size of markets may correspond to the number of individuals in a certain market who are potential customers, couriers, and/or merchants of a product or service. As used herein, the term market may be used to mean either a particular merchant, or a group of merchants associated with a particular product type. However, in some embodiments, the term market may refer to the total customers, couriers, and/or merchants in a given area that is part of the logistics platform. The neural network may identify particular market sizes as correlated with certain differences in times for order preparation or delivery. The size of markets may also correspond to new and more mature markets. For example, a newer market may be correlated with longer order preparation times, while more mature markets may be correlated with faster order preparation times.

Another input parameter may include fleet load factor, which corresponds to the ratio of number of orders outstanding to the number of couriers outstanding. In some embodiments, the higher this ratio of fleet load factors may correspond to an insufficient amount of couriers, and thus longer time durations for events after order ready event 218.

In some embodiments, the item types in an order may be input as parameters. For example, certain dishes may be correlated with particular preparation times. In some embodiments, the size of an order may be input as predictive parameters. In some embodiments, more items within an order may correlate to longer preparation times. In some embodiments, the sub-total price of an order may also correspond to order size or order preparation time. For example, a larger sub-total may correlate to a larger amount of items within the order. Additionally, more expensive items may take longer to make, due to more ingredients, more difficulty, or more specialization in preparation.

In some embodiments, the neural network may determine the average rate for time durations between one or more events on a courier timeline 210 for couriers in a given predetermined area. Similarly, in some embodiments, the neural network may determine the average rate for time durations between one or more events on a merchant timeline 210 for a particular merchant. However, historical performance may also be input as parameters.

For example, the historical performance of a courier may be a record of the previous time durations between one or more events on courier timeline 211 for a particular courier. This record may be compared to the average time durations between one or more events on courier timeline 211 for all couriers within a given area. The neural network may use this factor to assign a particular state variable to a given courier to adjust predictions accordingly. For example, a given courier may have shorter time durations between particular events, such as between parked at merchant 224 and arrival at merchant 226, as compared to the average for a given area. The neural network may adjust the ETA prediction for arrival at merchant 226 accordingly for this particular courier.

The historical performance of a particular merchant may also be input. This may include the average time duration between events on merchant timeline 210 for that particular merchant. The neural network may use this factor to assign a particular state variable to a given merchant to adjust predictions accordingly. For example, the average time for a particular merchant to prepare a particular item may be tracked and determined. As an example, some merchants may not transmit a confirmation of receipt of order, such as at event 216, but instead immediately begin preparation of the order. Once the order has been complete, the merchant may then transmit the confirmation of receipt of order and confirmation of completion of order simultaneously. The neural network may determine an ETA prediction accordingly such that a delivery routing system may appropriately assign a courier at the optimal time.

In some embodiments, historical performance parameters may be organized into aggregate units for a predetermined amount of time. For example, the historical performance of a courier or merchant for the previous thirty (30) day increment is given higher weighted values. In some embodiments, the historical performance parameters for days occurring before the previous thirty (30) days are also input with lower weighted values. In some embodiments, the historical performance parameters for days occurring before the previous thirty (30) days may be discarded.

In various embodiments, weights assigned to particular parameters may be updated based on other parameters. For example, the weight given to traffic may be adjusted in real-time as the time changes from peak rush hour to after rush hour. In some embodiments, one or more parameters may cause the neural network to maintain a particular state variable.

At 1110, an updated predicted estimated time of arrival (ETA) is generated. The parameters and timestamp are input into various computational layers of the subnetwork. In some embodiments, such computational layers may include, but are not limited to, linear layers, convolution layers, deconvolution layers, residual layers, quadratic layers, etc. In some embodiments, the timestamp of an event, or actual time of arrival (ATA) for the event, is input into one or more computational layers of a predictive model to output a predicted ETA for the delivery of the order, such as order delivery 232.

In other embodiments, the ATA of an event is input into one or more computational layers to output a predicted ETA for a subsequent delivery event. Then, the output predicted ETA is input into additional computational layers of another predictive model to determine additional predicted ETAs for additional delivery events. In some embodiments, each computational layer in a subnetwork may correspond to one or more parameters.

In some embodiments, a predicted ETA may be generated for each event on timelines 210 and 211. Predicted ETAs may also be generated for one or more events on timelines 410 and 411. In some embodiments, the predicted ETAs for one or more events may be transmitted to various client devices, such as customer devices, merchant devices, and courier devices. The predicted ETAs may further be used for delivery routing system for assignment of orders to couriers and merchants for delivery.

This approach divides the delivery process into distinct delivery events that are more predictable because they depend on unique features of the merchant, such as order protocol, food preparation speed, etc. Furthermore, the disclosed system provides increased capability of receiving the timestamp data for each delivery event through various applications and devices. Thus, there is a natural way to incorporate real-time updates to ETA predictions based on events that take place during a delivery.

At 1112, it is determined whether additional events exist for the delivery. If an ATA for the final event, such as order delivery 232, has been received, then process 1100 ends. However, if additional events exist, then process 1100 returns to operation 1102 to receive the timestamp of a subsequent event. The timestamp of the subsequent event may be used by the neural network to train itself by comparing the timestamp of the subsequent event with the predicted ETA at 1114.

At 1114, a corresponding event model is updated. In some embodiments, the processor dynamically generates the plurality of ETA time durations by continuously training a predictive event model using the plurality of weighted factors. In various embodiments, the weights may also be adjusted based on timestamps corresponding to ATAs of various delivery event updates that are received as described in FIGS. 10A-10C. When an event update is received, the neural network may compare the ATA with the predicted ETA for a particular event and analyze and differences. Based on the comparison, the neural network may update weights given to particular parameters to account for any differences between the predicted ETA and the received ATA for an event. As such, the predictive models in the neural network of the dynamic ETA prediction system are continuously being trained during operation.

Figure 12:
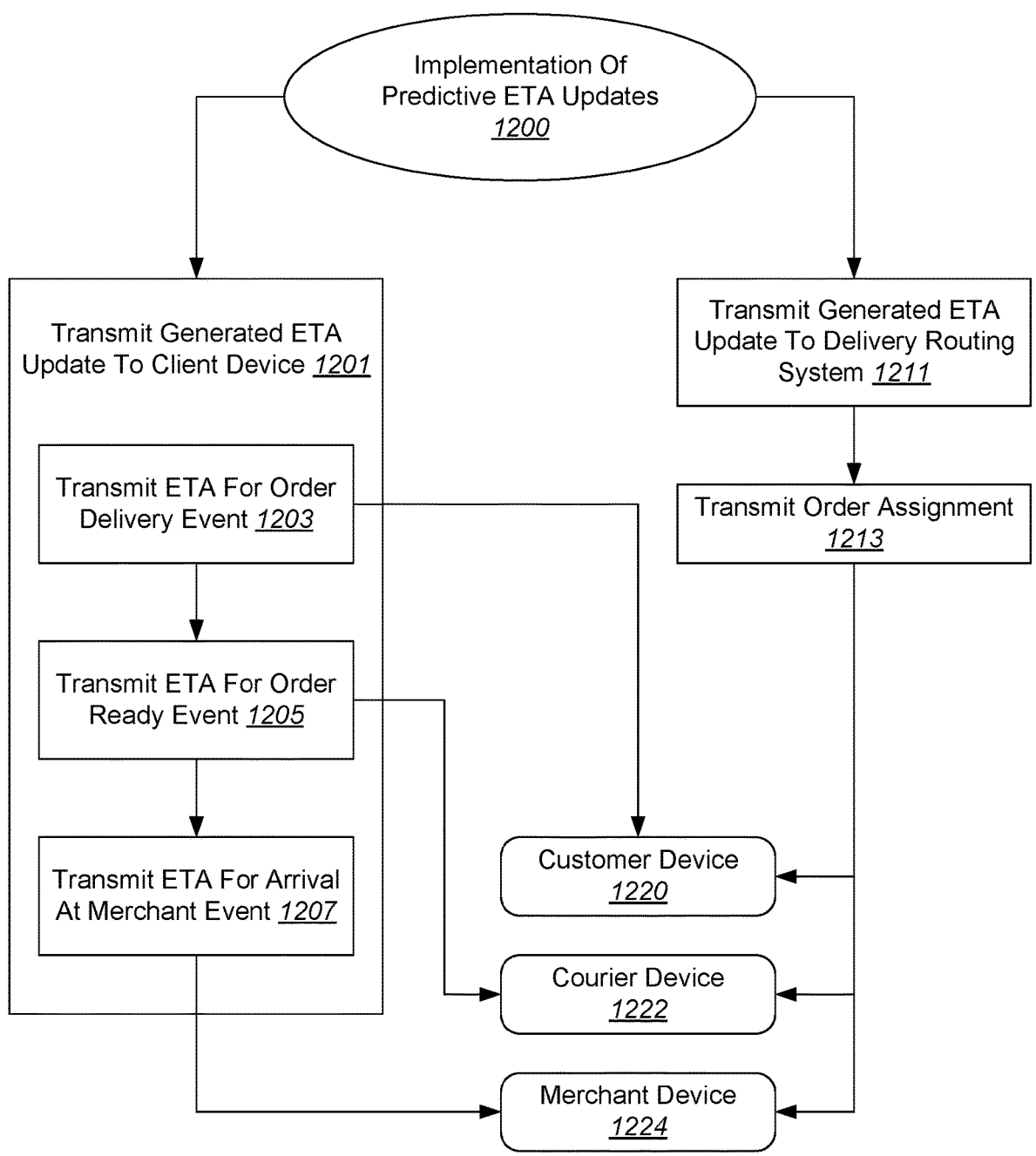
FIG. 12 illustrates an example flow process for implementation of predictive ETA updates, in accordance with one or more embodiments.

FIG. 12 illustrates an example flow process 1200 for implementation of predictive ETA updates, in accordance with one or more embodiments. As previously described, the described systems may generate predictive ETA updates for one or more delivery events, including completion of the order by the restaurant, pickup of the order by the courier, and completion of delivery of perishable goods to the customer. Such predictive ETA updates may be transmitted to various client devices at 1201. As shown in FIG. 12, such client devices include customer device 1220, courier device 1222, and merchant device 1224. Client devices 1220, 1222, and 1224 may be any one of client devices 902-908, as shown in FIG. 9.

For example, at step 1203, a predicted ETA for order delivery event 232 may be provided to the customer device 1220. As another example, at step 1205, the predicted ETA for order ready event 218 may be provided to the courier device 1224 to notify the courier that it is ready for pickup. As a further example, at 1207, the predicted ETA for arrival at merchant event 226 may be provided to the merchant device 1224 to notify the merchant when to expect a courier to arrive. One or more predicted ETA updates for various other events may be transmitted to any one of client devices 1220, 1222, and 1224.

The disclosed systems may also provide a delivery routing system with timestamps necessary to make informed decisions on when deliveries should be assigned to a courier. In some embodiments, the predicted ETA updates are transmitted to a delivery routing system at step 1211. Such delivery routing system may input the ETA updates into an assignment algorithm to assign couriers to a plurality of received orders. In some embodiments, the delivery routing system may assign subsequent orders to a courier based on the predicted ETAs for various events. For example, a subsequent order may be assigned to a courier that is currently en route to a customer location based on the predicted ETA for the order delivery event 232. In some embodiments, the assignment of a subsequent order may also depend on the predicted ETA of the order ready event 218 of the subsequent order, as well as distance and travel time parameters of the courier to the merchant corresponding to the subsequent order.

In various embodiments, at step 1213, the order assignment may be transmitted to a customer device 1220 to notify the customer of information corresponding to the courier, such as identification, contact information, etc. In some embodiments, the order assignment may be transmitted to the courier device 1222 to notify the courier of information corresponding to the merchant and/or customer, such as location, contact information, order information, etc. In some embodiments, the order assignment may be transmitted to the merchant device 1224 to notify the merchant of information corresponding to the customer and/or courier, including contact information.

In some embodiments, the delivery routing system may assign multiple orders to the same courier. For example, multiple orders being delivered to customer locations that are within a predetermined distance may be assigned to the same courier to optimize a travel route for delivery, such as reducing the distance or time of travel. In some embodiments, the predicted ETAs for order ready events 218 of such multiple orders may be input to determine whether a single courier should be assigned to pick up the multiple orders.

Additionally, it provides a method for pinpoint issues to determine which part of a delivery went wrong by comparing predicted and actual event timestamps. In some embodiments, the plurality of ETA time durations may be used to escalate issues and determine which part of a delivery went wrong by comparing predicted and actual event timestamps. For example, any large discrepancies between predicted ETAs and ATAs for events in a delivery may be identified to pinpoint where delays occurred amongst the delivery events, as well as identify major causes for delays. For example, for a particular delivery, the greatest discrepancy between predicted ETA and ATA may be identified for the parked at merchant event 224. If multiple instances of such discrepancy occur for multiple couriers, the cause may be identified as a lack of parking areas near such merchant. Once identified, this issue may be appropriately addressed to further optimize deliveries.

Figure 13:
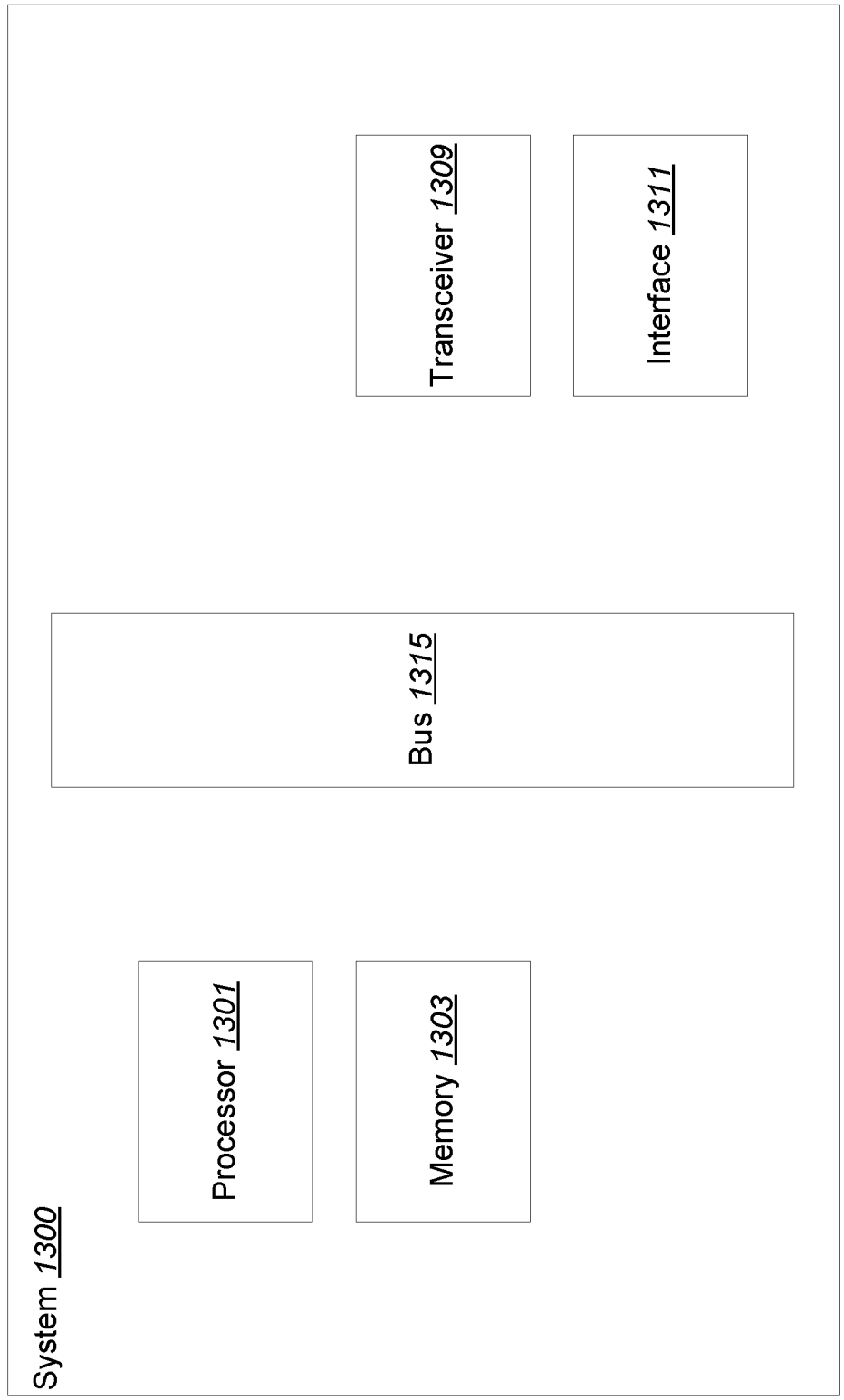
FIG. 13 illustrates a particular example of a computer system that can be used with various embodiments of the present disclosure.

Various computing devices can implement the methods described herein. For instance, a mobile device, computer system, etc. can be used to generate dynamic ETA predictive updates. With reference to FIG. 13, shown is a particular example of a computer system 1300 that can be used to implement particular examples of the present disclosure. According to particular example embodiments, a system 1300 suitable for implementing particular embodiments of the present disclosure includes a processor 1301, a memory 1303, a transceiver 1309, an interface 1311, and a bus 1315 (e.g., a PCI bus). When acting under the control of appropriate software or firmware, the processor 1301 is responsible for processing inputs through various computational layers and algorithms in a neural network. In some embodiments, the processor is responsible for updating the parameters of each computational layer using algorithms, including but not limited to, a stochastic gradient descent algorithm and a back propagation algorithm. Various specially configured devices can also be used in place of a processor 1301 or in addition to processor 1301. The complete implementation can also be done in custom hardware.

The interface 1311 is typically configured to send and receive data packets or data segments over a network. Particular examples of interfaces the device supports include Ethernet interfaces, frame relay interfaces, cable interfaces, DSL interfaces, token ring interfaces, and the like. The interface 1311 may include separate input and output interfaces, or may be a unified interface supporting both operations. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

Transceiver 1309 is typically a combination transmitter/receiver device. However system 1300 may include a transmitter and a receiver as separate components in some embodiments. Transceiver 1309 may be configured to transmit and/or receive various wireless signals, including Wi-Fi, Bluetooth, etc. In some embodiments, system 1300 may function as a client device or location sensor or beacon to track location of an individual via wireless signals. The connection or communication between a client device and a beacon may indicate the presence of the corresponding individual in a particular location. In various embodiments, transceiver 1309 may operate in a half duplex or full duplex mode. Various protocols could be used including various flavors of Bluetooth, Wi-Fi, light of sight transmission mechanisms, passive and active RFID signals, cellular data, mobile-satellite communications, as well as LPWAN, GPS, and other networking protocols. According to various embodiments, the transceiver may operate as a Bluetooth or Wi-Fi booster or repeater.

According to particular example embodiments, the system 1300 uses memory 1303 to store data and program instructions for operations including training a neural network and generating ETA predictions, such as method 1100 and implementing the predictive ETA updates, such as method 1200. The program instructions may control the operation of an operating system and/or one or more applications, for example. The memory or memories may also be configured to store received metadata and batch requested metadata. The memory or memories may also be configured to store data corresponding to parameters and weighted factors.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A method comprising:
   receiving a first order message from a first customer device corresponding to a first customer, the first order message including a first timestamp and a first order for real-time delivery of perishable goods from a first merchant, wherein the first customer is located in a delivery area;
   training a neural network to dynamically generate estimated time of arrivals (ETAs) for one or more first events for the first order, including a first ETA, wherein the neural network comprises a plurality of computational layers including weighted parameters, wherein training the neural network includes:
      receiving a dataset including a series of successive training events with corresponding known time durations between training events, and
      inputting different combinations of training events and time durations, and comparing generated ETA predictions with known time durations between training events to automatically and iteratively adjust the weighted parameters in the neural network;
   inputting the first timestamp corresponding to the first order message into the neural network to automatically generate the first ETA using the weighted parameters;
   transmitting a first order notification to a first courier device corresponding to a first merchant courier based on the first ETA, wherein the first order notification includes: a location of the first merchant and a location of a merchant depot, wherein the first order is grouped into a first batch of orders at the merchant depot, wherein the first batch of orders includes one or more orders and is grouped based upon a proximity of delivery destinations of the one or more orders in the first batch of orders to a customer depot; and
   transmitting a routing notification to a second courier device corresponding to a depot courier based on one or more of the ETAs, wherein the routing notification includes a location of the customer depot corresponding to the delivery area.

2. The method of claim 1, further comprising:
   receiving one or more other batches of orders at the customer depot, wherein the one or more other batches of orders are received from one or more other merchant depots by one or more other depot couriers.

3. The method of claim 1, wherein the weighted parameters further include one or more of the following: data on dishes in the first order, a sub-total of the first order, a number of current orders received at the first merchant, time, data, and weather.

4. The method of claim 1, wherein the one or more first events include one or more of the following:
   completion of the first order by the first merchant,
   arrival of the first order at the merchant depot,
   arrival of the first order at the customer depot, and
   delivery of the first order to the first customer.

5. The method of claim 1, wherein the one or more first events are received from one or more of the following:
   the first customer device,
   a first merchant device corresponding to the first merchant,
   the first courier device,
   the second courier device,
   a client device corresponding to the merchant depot, and
   a client device corresponding to the customer depot.

6. The method of claim 1,
   wherein the delivery area is an autonomous zone configured for operation of an autonomous vehicle;
   wherein the method further comprises transmitting a dispatch message to a first delivery courier based on one or more of the ETAs for the one or more first events, wherein the dispatch message includes an identification of the first order and a location of the first customer in the delivery area, wherein the first delivery courier comprises a first autonomous vehicle.

7. The method of claim 1,
   wherein the depot courier comprises an autonomous vehicle; and
   wherein the depot courier travels along a predetermined route between the merchant depot and the customer depot.

8. The method of claim 1, wherein the customer depot comprises an automated locker system with a plurality of storage compartments for storing one or more orders, wherein the plurality of storage compartments are configured to authenticate the depot courier.

9. The method of claim 1, further comprising
   receiving a second order message from a second customer device corresponding to a second customer, the second order message including a second timestamp and a second order for real-time delivery of perishable goods from a second merchant, wherein the second customer is located in the delivery area;
   inputting the second timestamp corresponding to the second order message into the neural network to automatically generate ETAs for one or more second events for the second order using the weighted parameters, including a second ETA; and
   transmitting a second order notification to a third courier device corresponding to a second merchant courier based on the second ETA, wherein the second order notification includes: a location of the second merchant and the location of the merchant depot, wherein the second order is grouped into the first batch of orders at the merchant depot.

10. The method of claim 1, further comprising:
inputting an updated timestamp for a subsequent event of the one or more first events into the neural network to automatically adjust the first ETA with an updated ETA; and
updating the first order notification to include the updated ETA.

11. A system comprising:
one or more processors;
memory; and
one or more programs stored in the memory, the one or more programs comprising instructions for:
receiving a first order message from a first customer device corresponding to a first customer, the first order message including a first timestamp and a first order for real-time delivery of perishable goods from a first merchant, wherein the first customer is located in a delivery area;
training a neural network to dynamically generate estimated time of arrivals (ETAs) for one or more first events for the first order, including a first ETA, wherein the neural network comprises a plurality of computational layers including weighted parameters, wherein training the neural network includes:
receiving a dataset including a series of successive training events with corresponding known time durations between training events, and
inputting different combinations of training events and time durations, and comparing generated ETA predictions with known time durations between training events to automatically and iteratively adjust the weighted parameters in the neural network;
inputting the first timestamp corresponding to the first order message into the neural network to automatically generate the first ETA using the weighted parameters;
transmitting a first order notification to a first courier device corresponding to a first merchant courier based on the first ETA, wherein the first order notification includes: a location of the first merchant and a location of a merchant depot, wherein the first order is grouped into a first batch of orders at the merchant depot, wherein the first batch of orders includes one or more orders and is grouped based upon a proximity of delivery destinations of the one or more orders in the first batch of orders to a customer depot; and
transmitting a routing notification to a second courier device corresponding to a depot courier based on one or more of the ETAs, wherein the routing notification includes a location of the customer depot corresponding to the delivery area.

12. The system of claim 11, wherein one or more other batches of orders are received at the customer depot, wherein the one or more other batches of orders are received from one or more other merchant depots by one or more other depot couriers.

13. The system of claim 11, wherein the one or more first events include one or more of the following:
completion of the first order by the first merchant,
arrival of the first order at the merchant depot,
arrival of the first order at the customer depot, and
delivery of the first order to the first customer.

14. The system of claim 11, wherein the one or more first events are received from one or more of the following:
the first customer device,
a first merchant device corresponding to the first merchant,
the first courier device,
the second courier device,
a client device corresponding to the merchant depot, and
a client device corresponding to the customer depot.

15. The system of claim 11,
wherein the delivery area is an autonomous zone configured for operation of an autonomous vehicle;
wherein the one or more programs further comprise instructions for transmitting a dispatch message to a first delivery courier based on one or more of the ETAs for the one or more first events, wherein the dispatch message includes an identification of the first order and a location of the first customer in the delivery area, wherein the first delivery courier comprises a first autonomous vehicle.

16. The system of claim 11,
wherein the depot courier comprises an autonomous vehicle; and
wherein the depot courier travels along a predetermined route between the merchant depot and the customer depot.

17. The system of claim 11, wherein the customer depot comprises an automated locker system with a plurality of storage compartments for storing one or more orders, wherein the plurality of storage compartments are configured to the depot courier.

18. The system of claim 11, wherein the one or more programs further comprise instructions for:
receiving a second order message from a second customer device corresponding to a second customer, the second order message including a second timestamp and a second order for real-time delivery of perishable goods from a second merchant, wherein the second customer is located in the delivery area corresponding to the customer depot;
inputting the second timestamp corresponding to the second order message into the neural network to automatically generate ETAs for one or more second events for the second order using the weighted parameters, including a second ETA; and
transmitting a second order notification to a third courier device corresponding to a second merchant courier based on the second ETA, wherein the second order notification includes: a location of the second merchant and the location of the merchant depot, wherein the second order is grouped into the first batch of orders at the merchant depot.

19. The system of claim 11, wherein the one or more programs further comprise instructions for:
inputting an updated timestamp for a subsequent event of the one or more first events into the neural network to automatically adjust the first ETA with an updated ETA; and
updating the first order notification to include the updated ETA.

20. A programmable device configured for aggregating on-demand deliveries of perishable goods, wherein the programmable device is configured for:
receiving a first order message from a first customer device corresponding to a first customer, the first order message including a first timestamp and a first order for real-time delivery of perishable goods from a first merchant, wherein the first customer is located in a delivery area;

training a neural network to dynamically generate estimated time of arrivals (ETAs) for one or more first events for the first order, including a first ETA, wherein the neural network comprises a plurality of computational layers including weighted parameters, wherein training the neural network includes:
  receiving a dataset including a series of successive training events with corresponding known time durations between training events, and
  inputting different combinations of training events and time durations, and comparing generated ETA predictions with known time durations between training events to automatically and iteratively adjust the weighted parameters in the neural network;
inputting the first timestamp corresponding to the first order message into the neural network to automatically generate the first ETA using the weighted parameters;
transmitting a first order notification to a first courier device corresponding to a first merchant courier based on the first ETA, wherein the first order notification includes: a location of the first merchant and a location of a merchant depot, wherein the first order is grouped into a first batch of orders at the merchant depot, wherein the first batch of orders includes one or more orders and is grouped based upon a proximity of delivery destinations of the one or more orders in the first batch of orders to a customer depot; and
transmitting a routing notification to a second courier device corresponding to a depot courier based on one or more of the ETAs, wherein the routing notification includes a location of the customer depot corresponding to the delivery area.

* * * * *